(12) United States Patent
Clover

(10) Patent No.: US 7,660,823 B2
(45) Date of Patent: Feb. 9, 2010

(54) COMPUTER-IMPLEMENTED SYSTEM AND METHOD FOR VISUALIZING OLAP AND MULTIDIMENSIONAL DATA IN A CALENDAR FORMAT

(75) Inventor: Lina Clover, Cary, NC (US)

(73) Assignee: SAS Institute Inc., Cary, NC (US)

(*) Notice: Subject to any disclaimer, the term of this patent is extended or adjusted under 35 U.S.C. 154(b) by 238 days.

(21) Appl. No.: 11/026,567

(22) Filed: Dec. 30, 2004

(65) Prior Publication Data

US 2006/0149778 A1 Jul. 6, 2006

(51) Int. Cl.
G06F 7/00 (2006.01)
G06F 17/00 (2006.01)
G06Q 40/00 (2006.01)

(52) U.S. Cl. .................. 707/104.1; 707/3; 707/102; 705/37

(58) Field of Classification Search .............. 705/30, 705/37
See application file for complete search history.

(56) References Cited

U.S. PATENT DOCUMENTS

| | | | |
|---|---|---|---|
| 5,767,854 A | 6/1998 | Anwar | |
| 5,898,431 A | 4/1999 | Webster et al. | |
| 5,926,820 A | 7/1999 | Agrawal et al. | |
| 6,182,060 B1 | 1/2001 | Hedgcock et al. | |
| 6,397,195 B1* | 5/2002 | Pinard et al. | 705/30 |
| 6,456,999 B1 | 9/2002 | Netz | |
| 6,470,344 B1 | 10/2002 | Kothuri et al. | |
| 6,484,179 B1 | 11/2002 | Roccaforte | |
| 6,546,135 B1 | 4/2003 | Lin et al. | |
| 6,581,068 B1 | 6/2003 | Bensoussan et al. | |
| 6,684,207 B1* | 1/2004 | Greenfield et al. | 707/3 |
| 6,728,724 B1 | 4/2004 | Megiddo et al. | |
| 6,750,864 B1 | 6/2004 | Anwar | |
| 6,839,719 B2* | 1/2005 | Wallace | 707/104.1 |
| 6,898,603 B1 | 5/2005 | Petculescu et al. | |
| 6,957,385 B2* | 10/2005 | Chan et al. | 715/220 |
| 7,051,038 B1* | 5/2006 | Yeh et al. | 707/102 |
| 7,089,266 B2 | 8/2006 | Stolte et al. | |
| 7,133,876 B2 | 11/2006 | Roussopoulos et al. | |
| 2004/0111388 A1 | 6/2004 | Boiscuvier et al. | |
| 2005/0066277 A1 | 3/2005 | Leah et al. | |
| 2005/0234799 A1* | 10/2005 | Hansen et al. | 705/37 |

OTHER PUBLICATIONS

Pedersen et al., "Multidimensional Database Technology", Dec. 2001, IEEE, Computer, vol. 34, Issue 12, pp. 40-46.
De Prisco et al., "On Optimal Binary Search Trees", Apr. 1993, Information Processing Letters, vol. 45, pp. 249-253.
van Wijk, Jarke J. et al., "Cluster and Calendar based Visualization of Time Series Data", IEEE Symposium on Information Visualization (INFOVIS '99), San Francisco, pp. 1-6 [Oct. 25-26, 1999].

* cited by examiner

Primary Examiner—Apu M Mofiz
Assistant Examiner—Susan Y Chen
(74) Attorney, Agent, or Firm—Jones Day

(57) ABSTRACT

Computer-implemented systems and methods for displaying multidimensional data as graphical time-based objects. A system and method could include associating actual calendar units with time dimension members. The association can be based on the time periods and the corresponding time-level information in the cube's time dimension hierarchies. Query results involving time periods and time period analysis are displayed as graph chart objects within the time period's visual presentation.

37 Claims, 23 Drawing Sheets

Fig. 9

Year Comparison – By the quarters |

| 2003 | 2004 |

Q1
| January | February | March |
| | +55% | +55% |

Q2
| April | May | June |
| | +55% | +55% |

Q3
| July | August | September |
| | +55% | +55% |

Q4
| October | November | December |
| | +55% | +55% |

Time Dimension
Calendar Type: Year ▽
Comparison Periods: 2002, 2003
Change
Comparison Unit: Quarter ▽

Data Dimension
Products >
☑ Appliances
☑ Hardware
Change Data

Measure
Comparative Measure: Yearly Comparison
Change Measure

Summary Statistics
YTD Average:
YTD Maximum:
YTD Minimum:
Change

Other Comments
This table is generated at the end of each year.
Edit Comments

Year Comparison - By the Months

| 2003 / 2004 | | | |
|---|---|---|---|
| January +65% +85% | February +65% +85% | March +65% +85% | |
| April +65% +85% | May +65% +85% | June +65% +85% | |
| July +65% +85% | August +65% +85% | September +65% +85% | |
| October +65% +85% | November +65% +85% | December +65% +85% | |

550

Time Dimension

Calendar Type:
Year ▷
Comparison Periods:
2003, 2004
Change
Comparison Unit:
Month ▷

Data Dimension

Products >
☑ Appliances
☑ Hardware
Change Data

Measure: Sales

Comparative Measure:
Yearly Comparison
Change Measure

Summary Statistics

YTD Average:
YTD Maximum:
YTD Minimum:
Change

Other Comments

This table is generated at the end of each year.
Edit Comments

COMPUTER-IMPLEMENTED SYSTEM AND METHOD FOR VISUALIZING OLAP AND MULTIDIMENSIONAL DATA IN A CALENDAR FORMAT

TECHNICAL FIELD

This document relates generally to computer-implemented data processing systems and methods and more particularly to data presentation.

BACKGROUND

Database technology has evolved to where multidimensional data can be stored and retrieved. In a multidimensional database, data is categorized into measures which are numerical in nature and into time dimensions which characterize the measures. The time dimensions have hierarchies and have found utility in many fields, including the data warehousing field and the Online Analytical Processing (OLAP) field. Despite the evolution of database technology, data visualization of multidimensional data has remained limited.

SUMMARY

In accordance with the teachings provided herein, systems and methods for operation upon data processing devices are provided in order to overcome one or more of the aforementioned disadvantages or other disadvantages concerning the presentation of multidimensional data.

For example, a system and method can be configured to associate actual calendar dates with time dimension members. This association can be based on the time periods and the corresponding time-level information in a cube's time dimension hierarchies. Query results involving time periods and time period analysis are displayed as graph chart objects within the time period's visual presentation.

As another example, a system and method can be configured to generate a time dimension calendar to visualize time dimension hierarchy and/or time series analysis of multidimensional data. The time dimension hierarchy levels are mapped to actual time periods in the common date and time calendar. The tuple cell values of dimension members are represented graphically on calendars by chart objects. The user can interactively drill down on time periods by drilling on a date object, or can drill down by dimension members by using the chart objects. Additional comparative and summary statistics relating to time dimension and time functions can be presented in the calendar. The time dimension calendar can be customizable based on user preferences and locales.

As will be appreciated, the systems and methods disclosed herein are capable of other and different embodiments, and capable of modifications in various respects. Accordingly, the drawings and description set forth herein are to be regarded as illustrative in nature and not restrictive.

BRIEF DESCRIPTION OF THE DRAWINGS

FIG. 9 is a display illustrating a quarter calendar presentation example.

FIG. 10 is a display illustrating a single quarter presentation example.

FIG. 11 is a display illustrating a month summary calendar presentation example.

FIG. 12 is a display illustrating a day of the month calendar presentation example.

DETAILED DESCRIPTION

Figure 1:
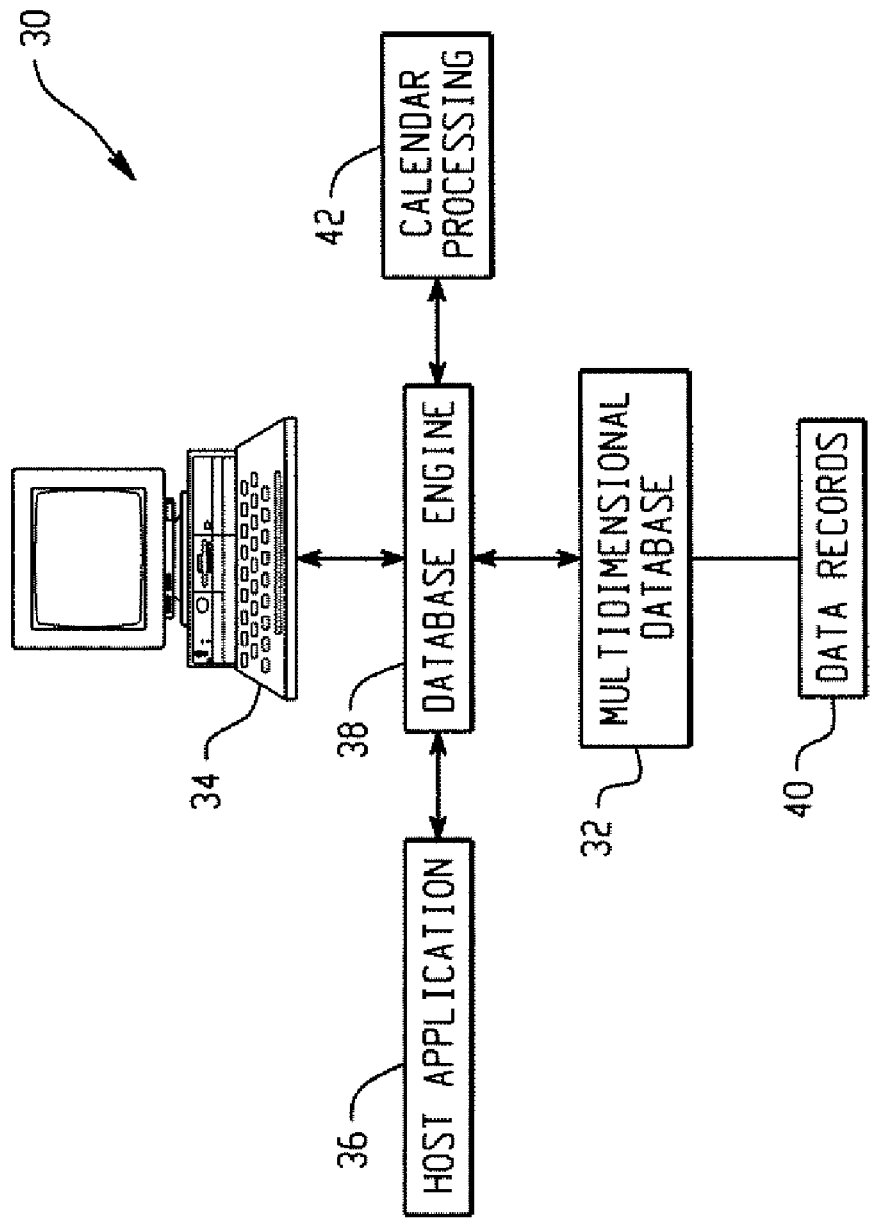
FIG. 1 is a block diagram depicting computer and software components for use with a multidimensional database.

FIG. 1 depicts at 30 a system for use with a multidimensional database 32. An end user 34 or a host application 36 (such as a data warehousing application, or an Online Analytical Processing (OLAP) or a data mining application) initiates a query to the multidimensional database 32 via a database engine (38). The database engine 38 processes the query, such as by parsing and translating, optimizing, and evaluating in order to formulate a logical expression from the query.

The logical expression can be in the form of a plurality of terms connected via a plurality of operators such as logical operators, relational operators, arithmetic operators, etc. The engine 38 then scans the multidimensional database 32 to locate and relate data records 40 that fulfill the logical expression and return results to the end user 34 or host application 36.

The results could be the data records themselves, such as a single data record for a singleton answer or a group of data records for an answer grid. However, within the system 30 of this example, results can be provided as a calendar-formatted display that is tied to or otherwise connected to one or more portions of the multidimensional database's hierarchy.

Calendar processing functionality 42 can be added to provide a connection or link between the multidimensional hierarchy and calendar-formatted graphical objects located on the display of the computer 34. When a user manipulates a graphical object on the displayed calendar, calendar processing functionality 42 receives information related to the user interaction and based upon the multidimensional hierarchy can assist in generating a new calendar-based display that addresses what the user had manipulated.

Figure 2:
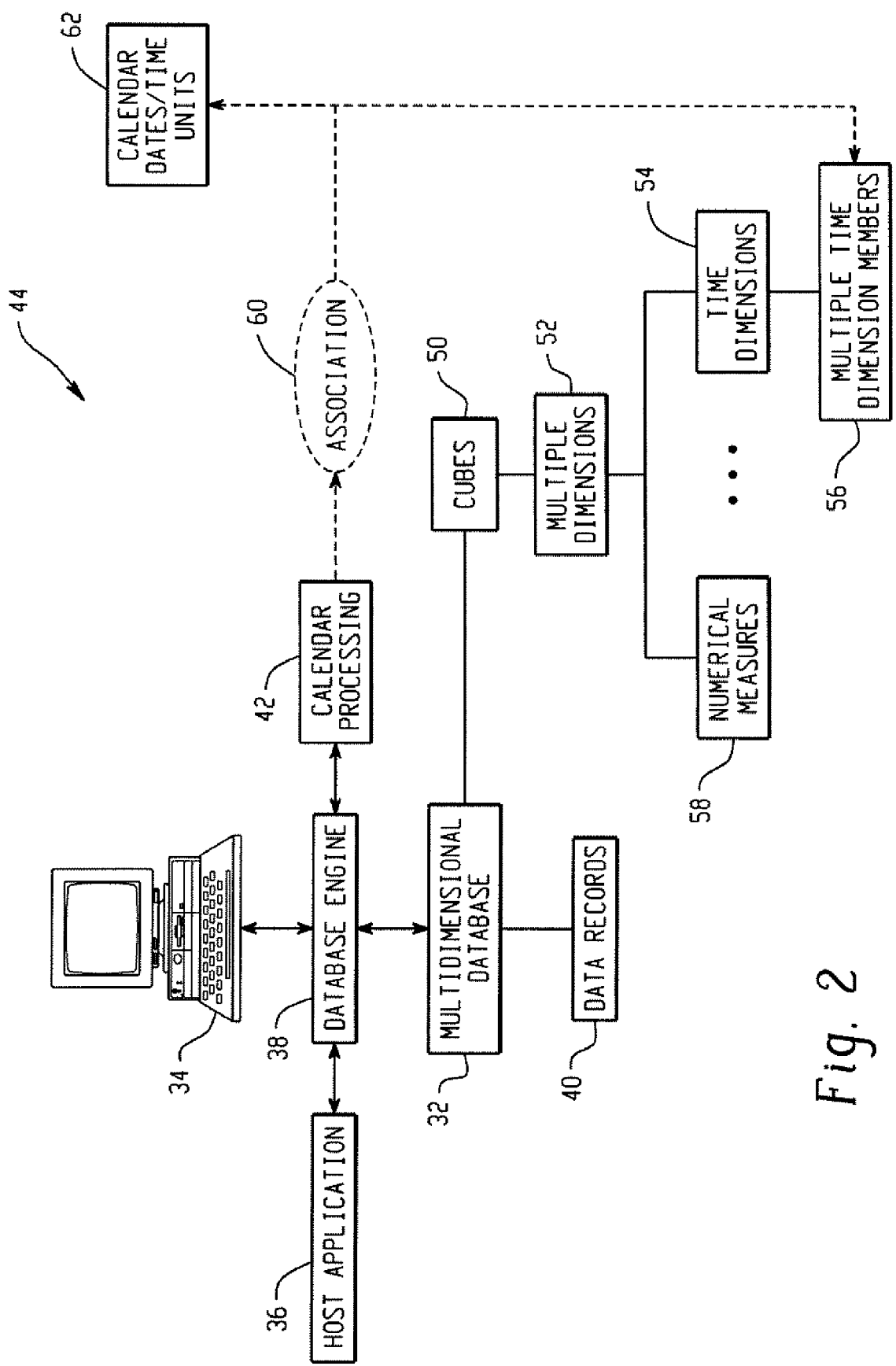
FIG. 2 is a block diagram depicting characteristics of a multidimensional database for use with time-based processing (e.g., calendar processing).

FIG. 2 illustrates a few characteristics of a multidimensional database 32 within a system 44. In the multidimensional database 32 of system 44, data records 40 contain numerical measures 58 and time dimensions 54 that characterize the numerical measures 58.

The multidimensional database 32 can contain other types of dimensions. For example, a textual dimension could contain geography information. The textual dimension could be arranged hierarchically starting from a general geographical designation to a more specific one—e.g., the geography hierarchy could be arranged at a state level which could decompose to a county geographical level which could decompose even further, such as to a city or township geographical level.

The multidimensional database 32 views data records 40 as cubes 50 that contain hierarchies of the dimensions 52. Stated another way, a cube 50 represents a particular set of dimensions that the user can use to view the data records 40.

The dimensions 52 of the database's cubes are used for selecting and aggregating data at the desired level of detail. A time dimension 54 can be organized into a hierarchy composed of multiple levels 56, each representing a level of detail for use within a desired type of analysis. For example, multidimensional data can contain time-related data aggregation along time period intervals. An aggregation can result in time period summaries for members of the cube. The time dimension levels may be ordered by level number ordinals in a logical time order. The level ordinal number represents the distance of the level from the root of the hierarchy with level zero being the root level number. Members belonging to the time dimension levels are related in parent-child relationships, where members belonging to a level with a low ordinal value will have children in a level with a higher ordinal value.

In the example of system 44 depicted in FIG. 2, calendar processing functionality 42 can be used to visualize time dimension hierarchy and time series analysis of multidimensional data by mapping 60 (e.g., associating) actual calendar dates 62 with time dimension members 56. The tuple cell values of dimension members are represented graphically on calendars by chart objects. Because of the mapping 60, a user can interactively drill down on time periods by drilling on a date object, or can drill down by dimension members by using the chart objects.

It should be understood that other or different calendar processing may be utilized, such as using the mapping 60 to drill up (e.g., from a lower time dimensional level to a higher time dimensional level). As another example, additional comparative and summary statistics relating to time dimension and time functions can be presented in a displayed calendar. The time dimension calendar could also be customizable based on user preferences and locales.

While FIG. 2 displays a single computer 34 having access to one or more calendar processing functions, computer 34 may be configured to locally have one or more calendar processing functions, or a system may be configured to have one or more of calendar processing functions accessible on a remote server over a network (e.g., local area network, wide area network, internet, etc.).

Moreover, a system can contain multiple computers that locally contain one or more calendar processing functions or have the functions accessible over a network. Data signal(s) can carry any or all of the data disclosed herein that is provided to or from a computer or device. Data signals may be conveyed via networks, fiber optic medium, carrier waves, wireless networks, etc. for communication among multiple computers or computing devices.

Figure 3:
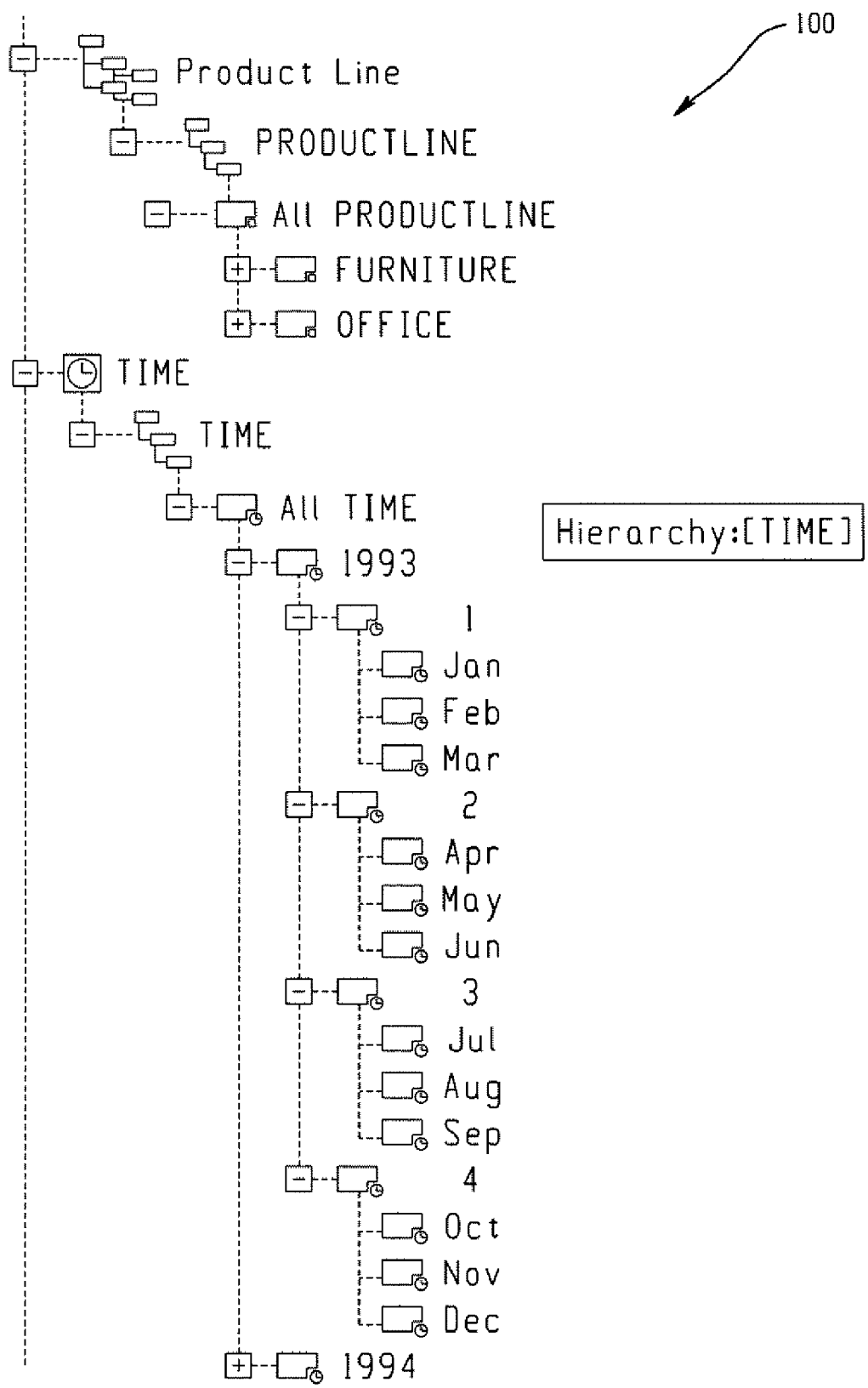
FIG. 3 is a display of a hierarchy from a multidimensional database.

FIG. 3 shows at 100 examples of different hierarchical structures that can be used in a multidimensional database. A "product line" dimensional hierarchy decomposes in this example into an "all productline" dimensional level which decomposes into a furniture and office dimensional level. A time-based dimensional hierarchy decomposes into an "all time" dimensional hierarchy which further decomposes into a year dimensional level (which, e.g., includes a 1993 dimensional level member, a 1994 dimensional level member, etc.). The year dimensional level itself decomposes into a quarterly dimensional level. The quarterly dimensional level decomposes into a monthly dimensional level. The time-based dimensional hierarchy could be further decomposed at more granular levels (e.g., a weekly level, a daily level, etc.). Numerical measures (e.g., sales values) can be stored as data records for the product lines at the different levels in the time dimensional hierarchy.

Figure 4:
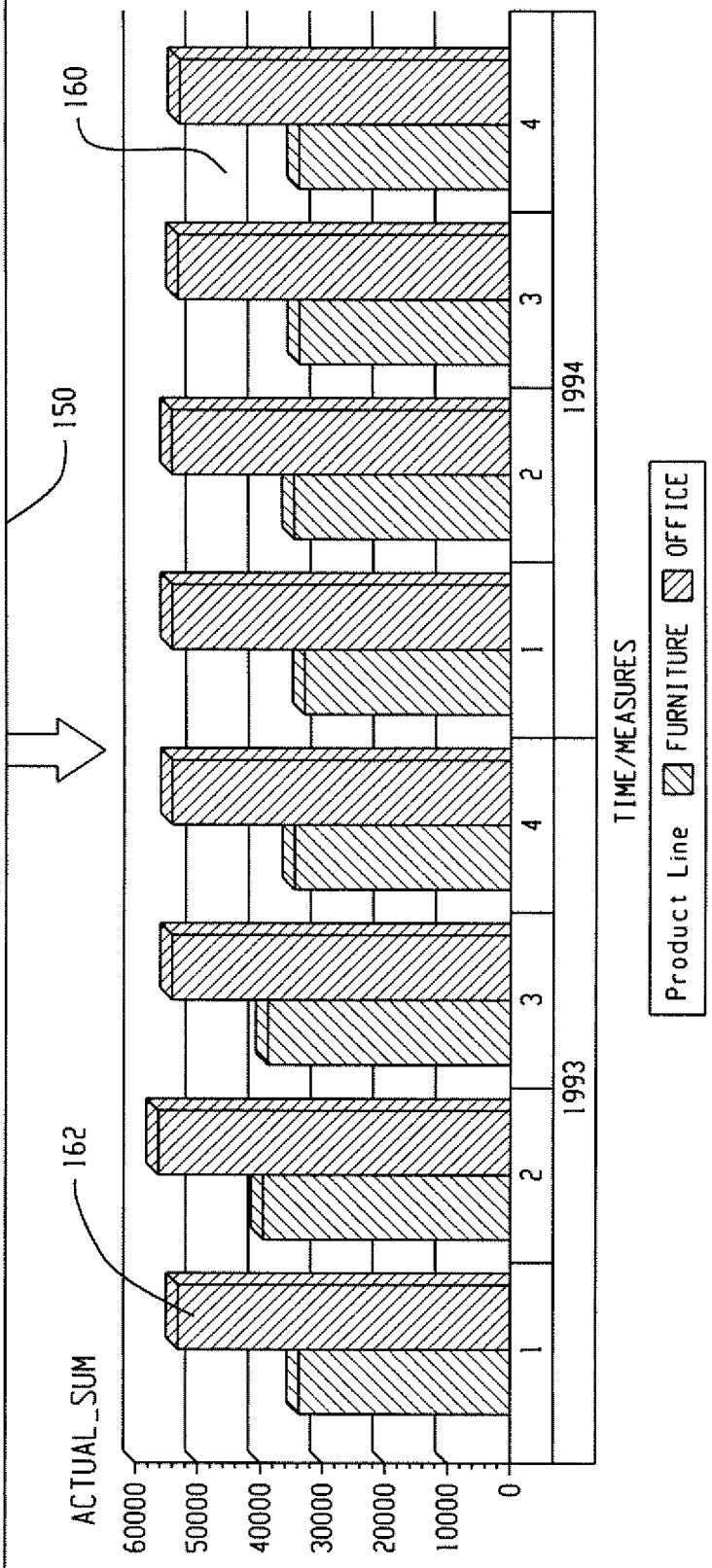
FIG. 4 is an example of a calendar-formatted output based upon an input multidimensional database query.

FIG. 4 shows an example of a multidimensional query 150 that takes into consideration the dimensional hierarchical structure 100 of FIG. 3. The multidimensional query 150 is formulated to compare quarterly sales for the years 1993 and 1994 for the furniture and office product lines. The query is processed and at least a portion of the results are formatted as graphical objects as shown at 160 in FIG. 4.

The graphical calendar-formatted display 160 shows the years 1993 and 1994 along the horizontal axis. The horizontal axis further shows the quarters for these years. The vertical axis shows sales data for the furniture and office product lines for each of the years' quarters. A user can see additional detail by manipulating (e.g., clicking upon or selecting) one or more of the graphical objects (e.g., bargraph object 162). The manipulation can result in the user seeing a more detailed time breakdown for bargraph 162, such as seeing the sales data on a weekly or daily basis.

The calendar data can be formatted in many different ways, such as web pages accessible over a network such as over the world-wide web (web). The web is a method of accessing information on the internet which allows a user to navigate the internet resources intuitively, without IP addresses or other technical knowledge. A user's computer can contain client software, known as a web "browser," which is used to display web pages as well as traditional non-web files on the client system.

Figure 5A:
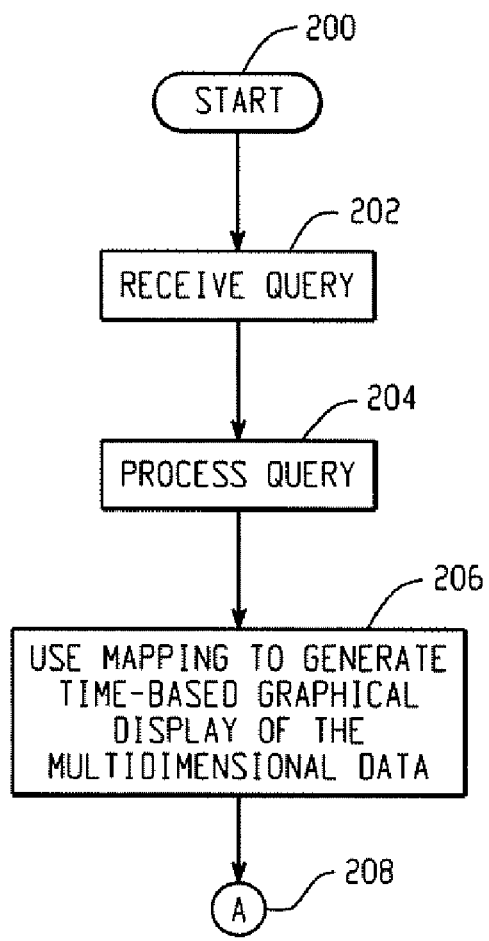
FIGS. 5A and 5B are flowcharts depicting an example of an operational scenario wherein a multidimensional query is processed such that a calendar representation is generated.
Figure 5B:
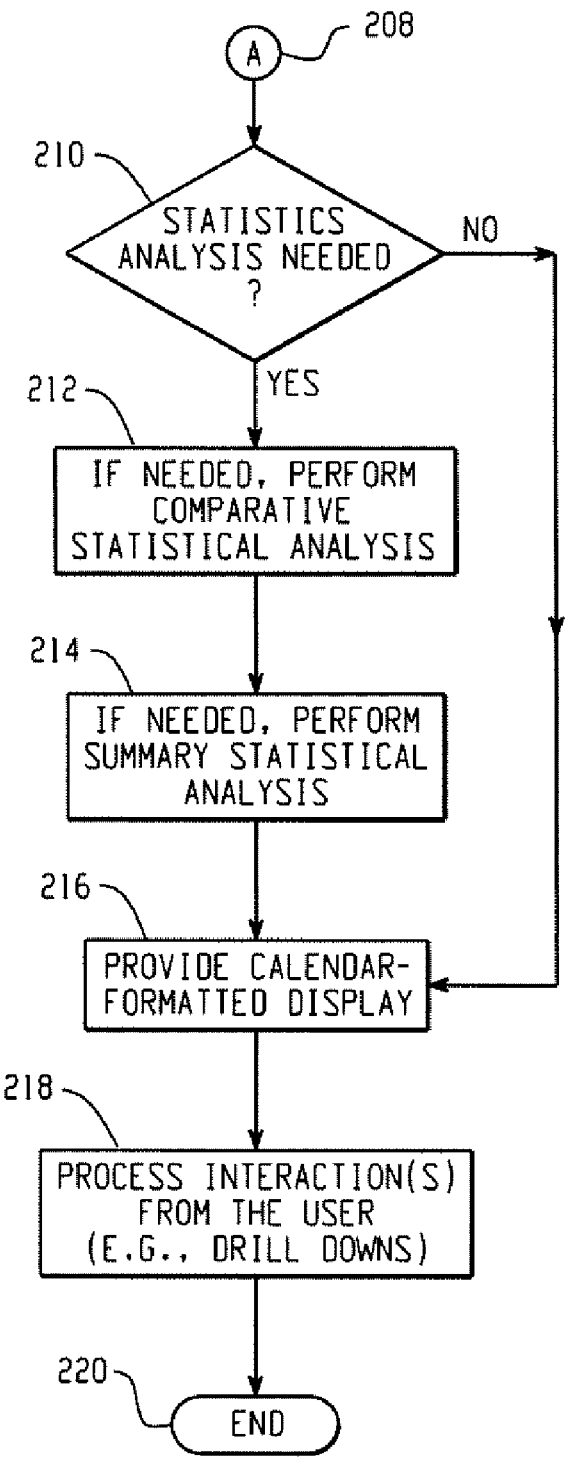

FIGS. 5A and 5B are flowcharts depicting an example of an operational scenario using calendar processing functions. With reference to FIG. 5A, start block 200 indicates that a query is received at process block 202 for retrieving data from a multidimensional database. Process block 204 processes the query, such as by using the mapping at process block 206 to generate a time-based graphical display of the data that satisfies the query received at process block 202.

More specifically in this operational scenario, an OLE database for OLAP can be used, and in a multidimensional result set, an ordered collection of members from different dimensions can be represented as a compound coordinate on a dataset axis. Processing continues at FIG. 5B as indicated at continuation marker 208.

With reference to FIG. 5B, decision block 210 examines whether the data requested in the query requires any statistical analysis associated with the retrieved data. Comparative and/or summary statistics can be performed respectively at process blocks 212 and 214 for use in generating a calendar-formatted display that meets the needs of the user. The computations involved in comparative statistical analysis and summary statistical analysis may be performed on the client-side and/or server-side. In this operational scenario, the comparative statistical analysis is performed on the client-side, and because of the computationally intensive nature of the summary statistical analysis, the summary statistical analysis is performed on the server-side.

In this operational scenario, many different types of comparative statistics can be used, such as the following calculations:

Parallel period comparison: a calculation that compares the value of measure/member tuple in the current period with the values of the same tuple in a parallel period. Parallel periods are periods that have the same parallel position in the time dimension hierarchy. For example, the year 2001 period has the years 2002, 2003, and 2004 as parallel periods. May of 2001 has parallel periods of May 2002, May 2003, and May 2004. The calculation results are shown as a percentage of the difference.

Consecutive period comparison: a calculation that compares the value of measure/member tuple in the current period with the values of the same tuple in a consecutive period. Consecutive periods are periods that have adjacent positions in the time dimension hierarchy. For example, year 2001 period has years 2000 and 2002, as adjacent periods. May of 2001 has April 2001 and June 2001 as adjacent periods. The calculation results are shown as a percentage of the difference.

Relative contribution analysis: a calculation can be made in four different ways:

1. The percentage of contribution of a current child member tuple relative to its parent total.

2. The percentage of contribution of the current child member relative to an overall total.

3. The percentage of contribution of the current time period relative to its parent time period total.

4. The percentage of contribution of the current time period relative to an all time total.

Figure 6:
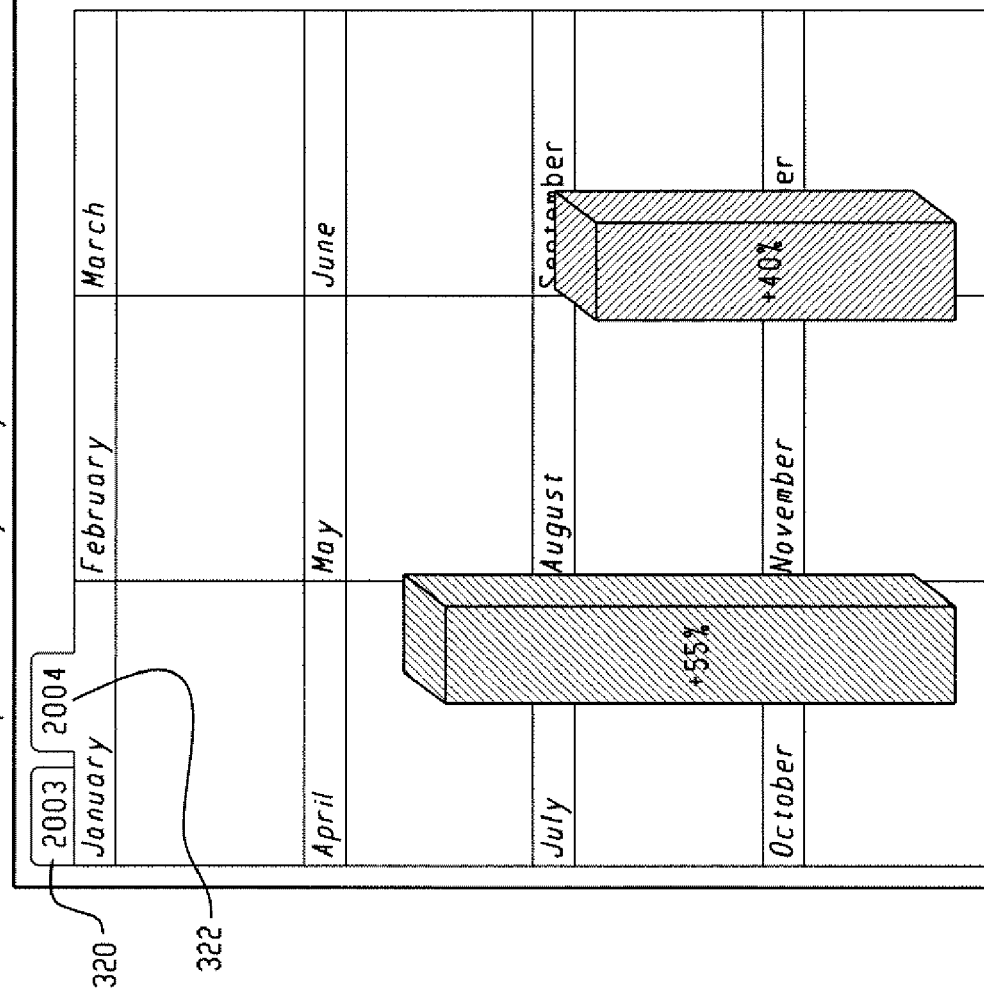
FIG. 6 is a display illustrating a year period calendar presentation example.

Comparative statistics may be placed on a chart, such as shown in FIG. 6 at 302. A user can change which comparative statistics are shown by manipulating (e.g., clicking upon) the change measure hyperlink shown at 304. After the hyperlink 304 is activated, a user interface appears wherein the user can specify which (if any) comparative statistics should be shown with the chart.

Time series summary statistics can also be presented within the calendar and placed in the calendar side bar, and could include the following calculations:

Year-to-Date YTD: The YTD total and YTD Average can be calculated for the current members displayed in the chart.

Quarter-to-Date QTD: The QTD total and QTD average can be calculated for the current members displayed in the chart.

Month-to-Date MTD: The MTD total and MTD average can be calculated for the current members displayed in the chart.

Week-to-Date WTD: The WTD total and WTD average can be calculated for the current members displayed in the chart.

Period-to-Date: for other time periods, such as Half years, Days and Hours, the Period to date total and the Period to date average can be calculated for the current members displayed in the chart.

Opening Period: Represents the value of the current members at the beginning of the time period, such as opening balances.

Closing Period: Represents the values of the current members at the end of the time period, such as closing balances.

Summary statistics may be placed on a chart, such as shown in FIG. 6 at 310. A user can change which summary statistics are shown by manipulating (e.g., clicking upon) the hyperlink shown at 312. After the hyperlink 312 is activated, a user interface appears wherein the user can specify which (if any) summary statistics should be shown with the chart.

Any other user defined calculations can be specified by the user to display in the calendar. Such calculation might be a 5 Year Average, 2 Years Total, etc.

If statistics are not needed as determined at decision block 210, then processing continues at process block 216 wherein the calendar-formatted display is provided to the requester or to an entity that requires the display. Process block 218 processes interactions from the user, such as a user interacting with the graph in order to drill down to view more detail associated with a particular time dimension. As an example of interaction handling, graphical objects (e.g., a date barchart object) that are generated and that comprise the graphical display can be used such that a user can activate (e.g., click upon) a graphical object in order to do a drill down (or drill up) operation. Based upon the user's interaction, an event notification is sent from the client's web browser to a computer program/routine for use in formulating a multidimensional database query to retrieve data in response to the drill down (or drill up) operation. For example, the event notification, among other things, can contain what date barchart object had been activated by the user. Using the hierarchy association between actual calendar dates/time units with levels of the time dimension hierarchy, the program/routine formulates the multidimensional database query to retrieve data at a lower level (or higher level) associated with the time dimension hierarchy in order to respond to the drill down (or drill up) operation. The multidimensional database query can then be handled by a process, such as by process block 202. Processing for this operational scenario ends at end block 220.

It should be understood that similar to the other processing flows described herein, the steps and the order of the steps in the flowchart may be altered, modified, deleted and/or augmented and still meet the situation at hand. Moreover, the steps may be performed on the same computer or distributed across multiple computers (e.g., client computers and server computers) to meet the situation at hand.

FIG. 6 illustrates another calendar-formatted display that contains four dimensions: Time, Measure, Products, and Geography. Sales is a measure in the Measures dimension and represents gross sales calculation for products in regions over time periods. Appliances and Hardware are members in the Product Dimension. The time dimension contains two hierarchies:

the first time hierarchy is organized by years, quarters, months, and days.

the second time hierarchy can be drilled by years, months, days and hours.

In the calendar pages interface of FIG. 6 and other figures shown herein, time levels in the dimensional hierarchy are mapped to correspond to an actual date, a date range, or a time stamp (e.g., actual displayed calendar date 2003 and actual date 2004 shown in FIG. 6 respectively at 320 and 322). Time periods represented by a calendar are: Years, Half Years, Quarters, Months, Weeks, Days, and Hours. These periods correspond to the OLE DB for OLAP enumerated time dimension level types of:

MDLEVEL_TYPE_TIME_YEARS represented by the Year period GUI (graphical user interface) (as shown in FIG. 6).

Figure 7:
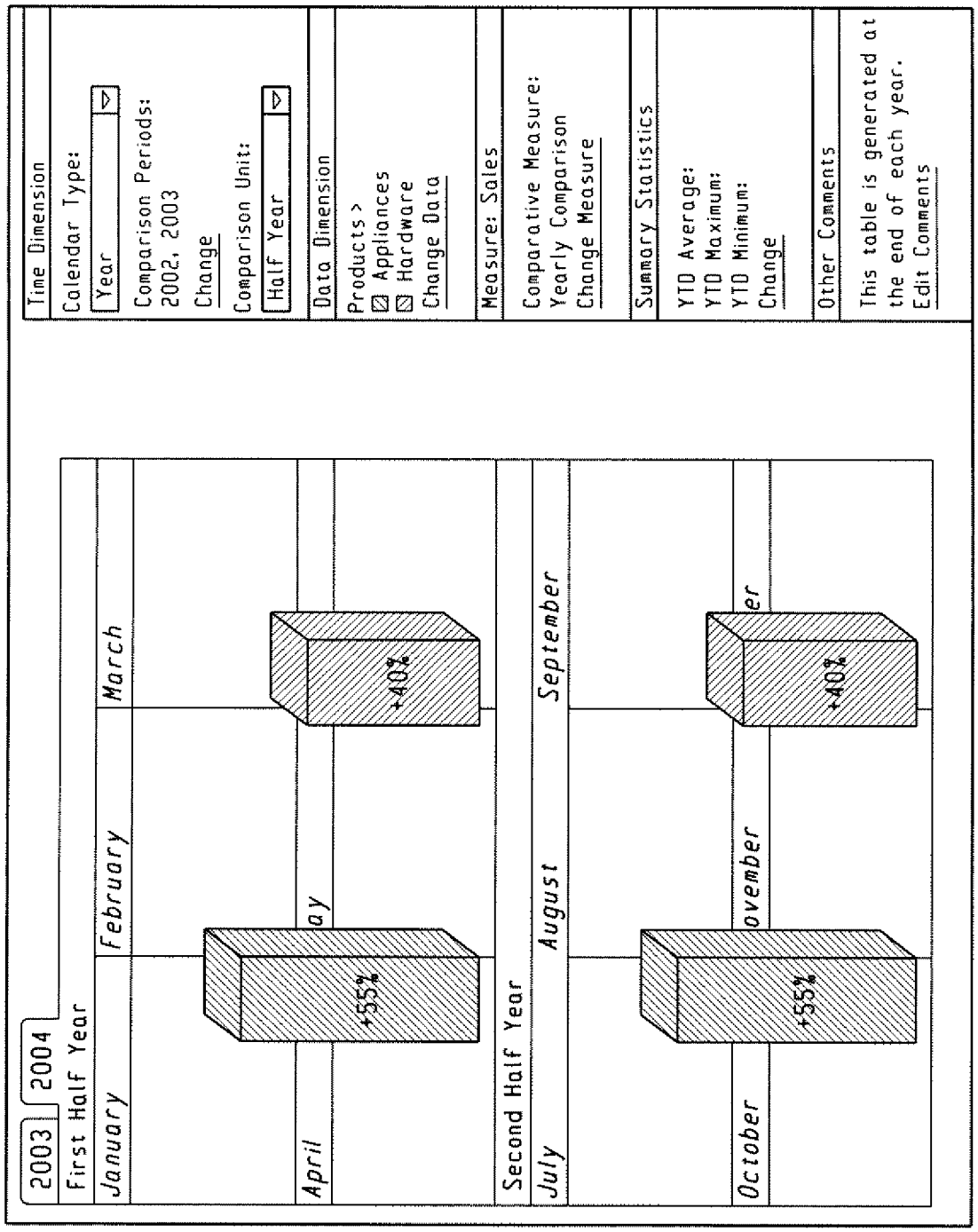
FIG. 7 is a display illustrating a half-year period calendar presentation example.

MDLEVEL_TYPE_TIME_HALF_YEAR represented by the Half-Year period GUI (as shown in FIG. 7).

Figure 8:
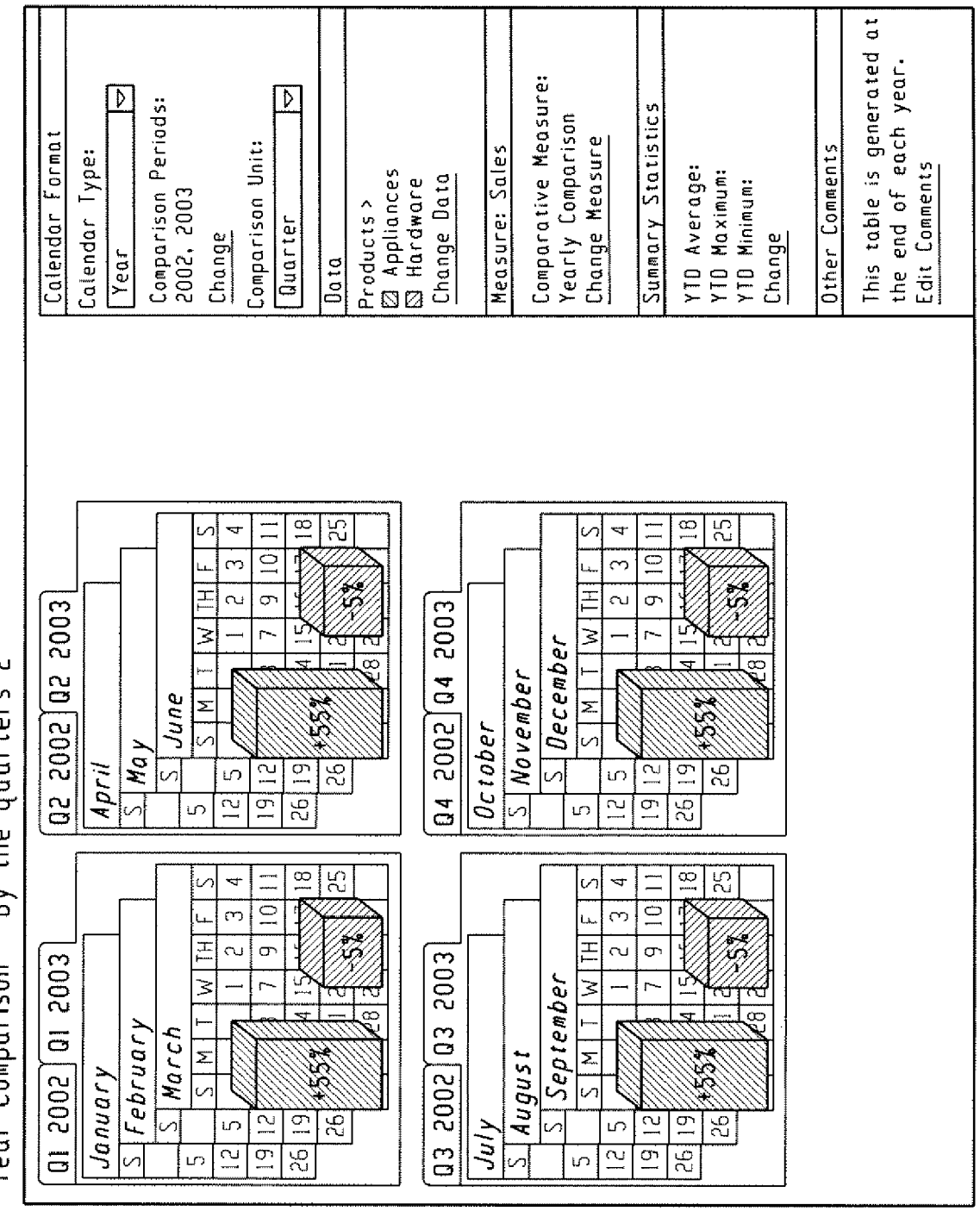
FIG. 8 is a display illustrating a quarter period calendar presentation example.

MDLEVEL_TYPE_TIME_QUARTERS represented by the Quarters period GUI (as shown in FIGS. 8 and 9).

Figure 10:
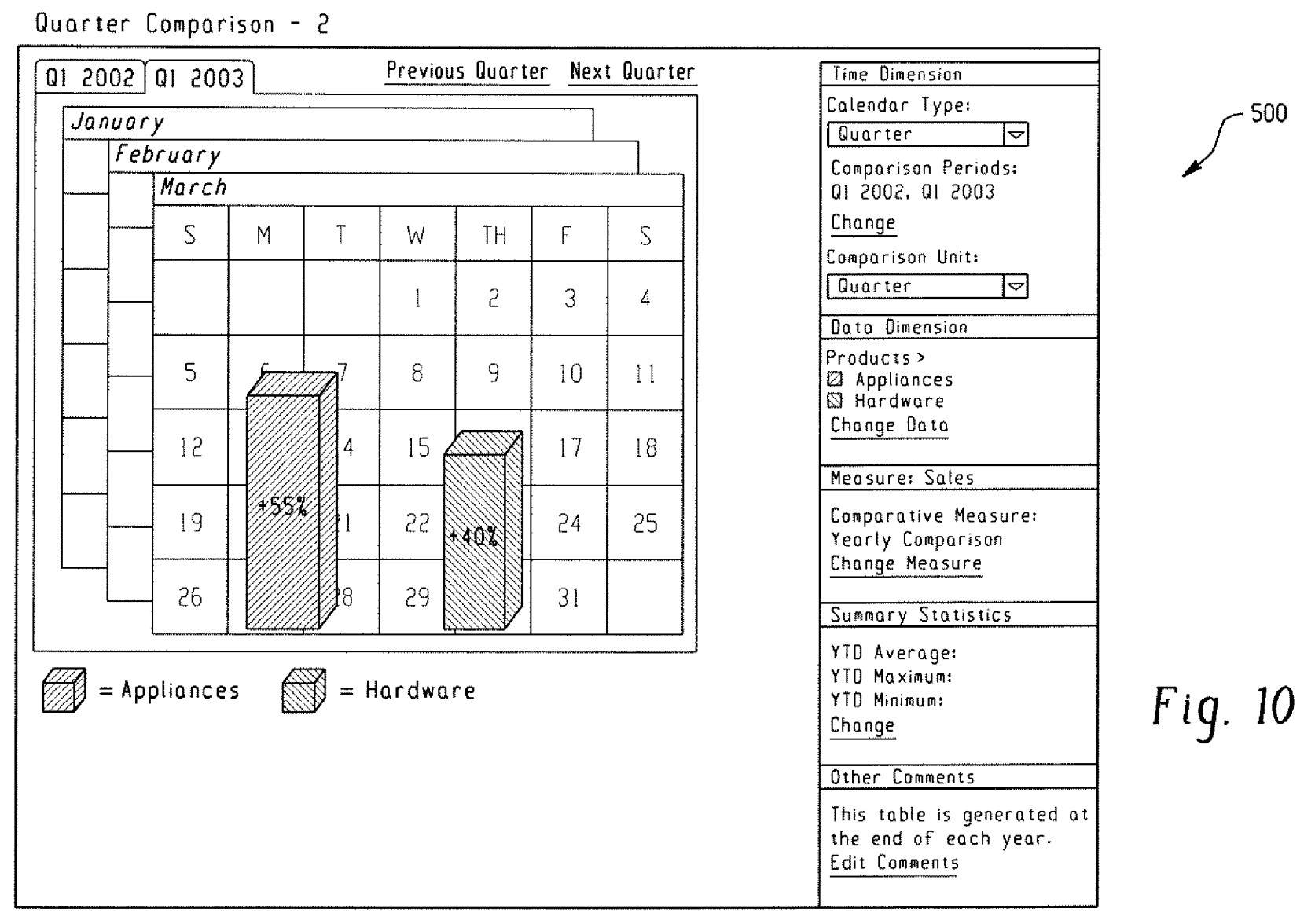

MDLEVEL_TYPE_TIME_MONTHS represented by the Months period GUI (as shown in FIGS. 10 and 11).

Figure 12:
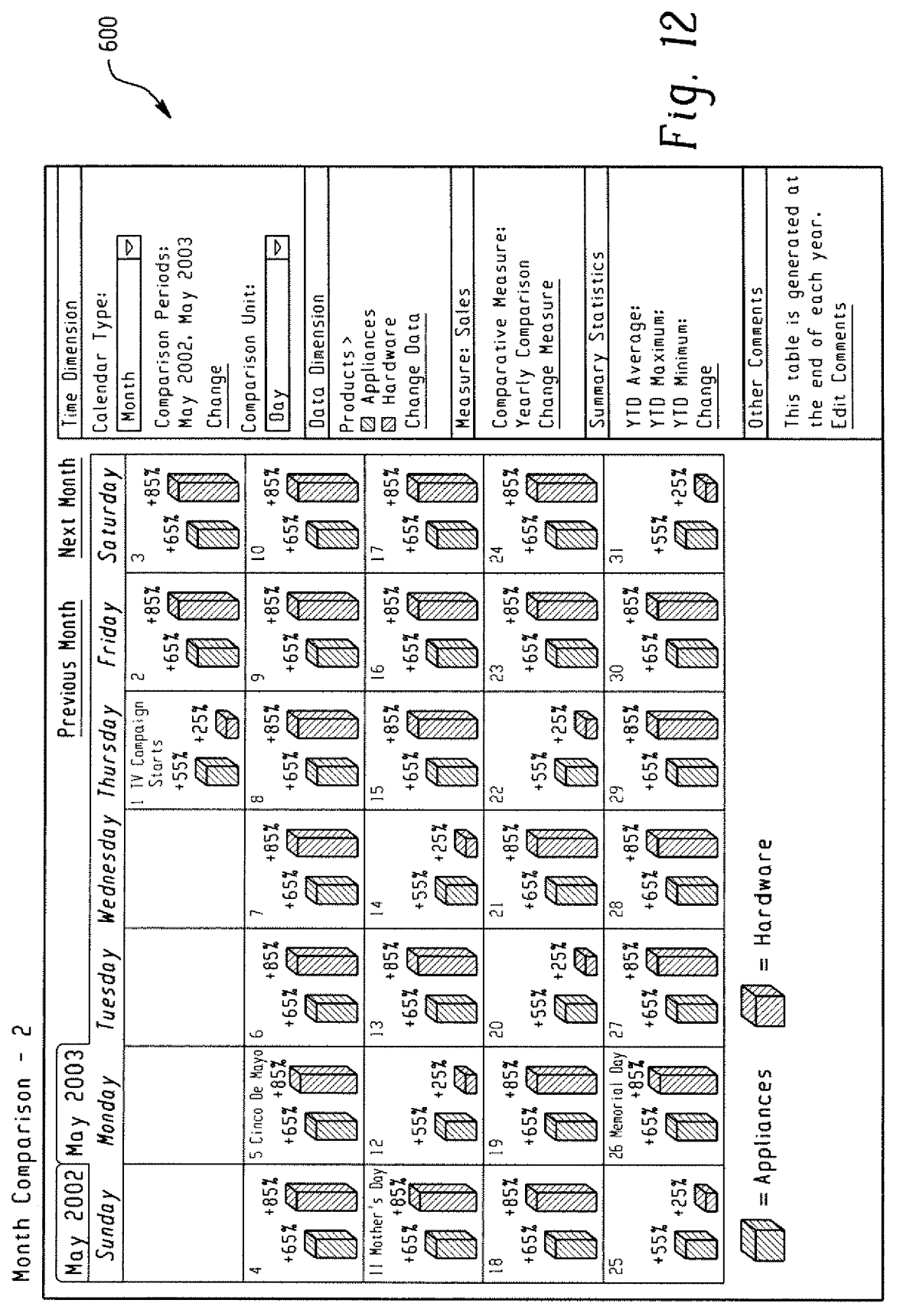

MDLEVEL_TYPE_TIME_DAYS represented by the Days period GUI (as shown in FIG. 12).

Figure 13:
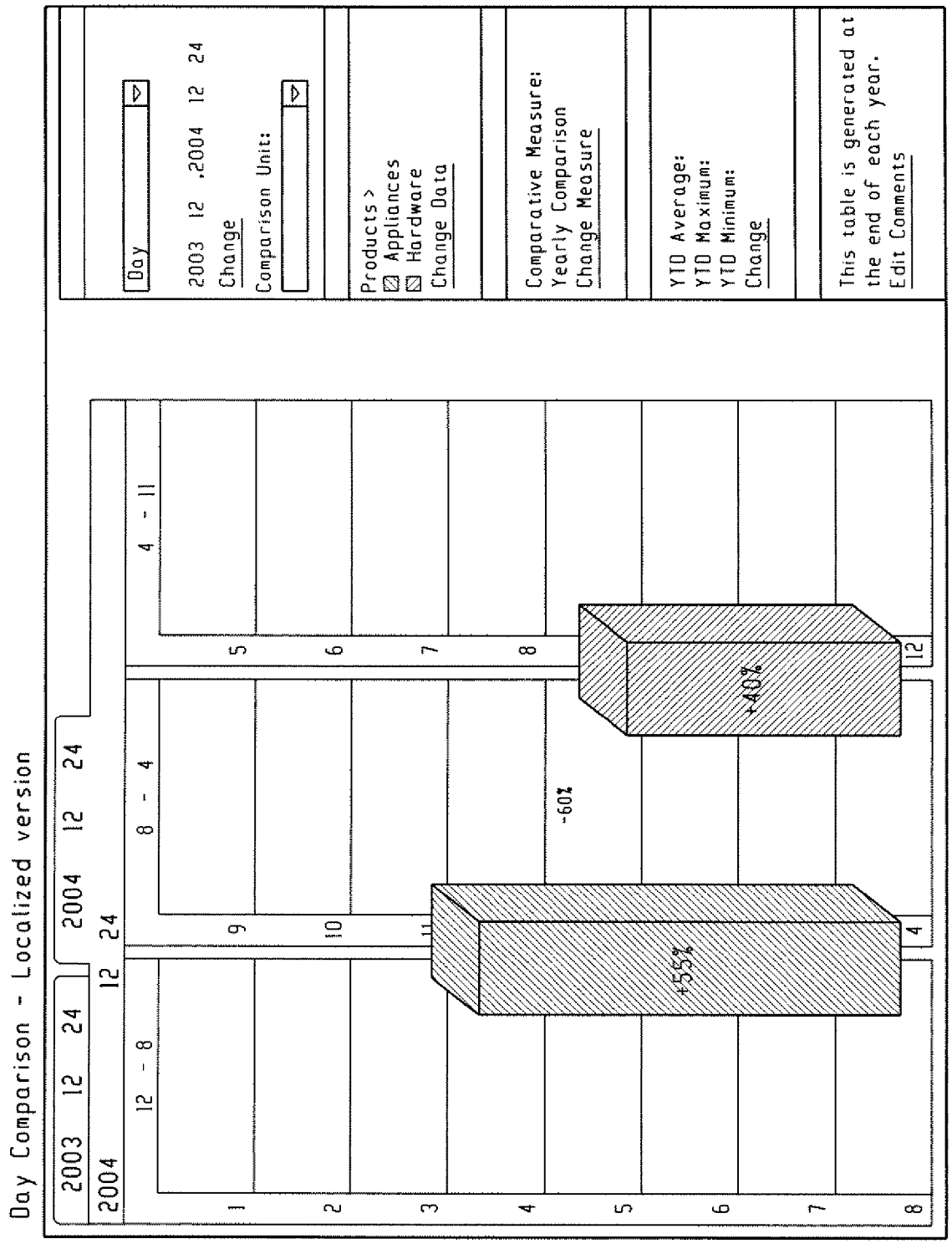
FIG. 13 is a display illustrating a day calendar presentation example.

MDLEVEL_TYPE_TIME_HOURS represented by the Hour period GUI (as shown in FIG. 13).

As shown at 300, FIG. 6 is a single level representation. Years 2003 and 2004 belong to the same level in the Time dimension hierarchy. The bar reflects values at the Year level. The chart bars represent the value of Appliances and Hardware for the year 2004. The +55% is the calculated percentage of difference between the appliances values in the year 2004 and 2003.

As shown at 350, FIG. 7 is a representation of two different time dimension levels. Years 2003 and 2004 are members of the Year level. The "First Half Year" member and "Second Half Year" member are the children of 2004 at the Half-Year level. Comparison is for the Half Year Level data.

As shown at 400, FIG. 8 is a chart which represents the Appliance and Hardware sales value for the 2003 and 2002 quarter periods. The quarter period children are stacked so that each month period is visible and can be selected to drill down to the day of month level values.

As shown at 450, FIG. 9 is an alternate style representation of the Quarter time level data. This style allows for the representation of three time levels periods—year, quarter, and months levels. The bar represents the values at the Quarter level. The user can select any of the months to drill down to the months values.

As shown at 500, FIG. 10 is a single Quarter Level member representation. The Comparison in this figure is between Q1 of 2003 and Q1 of 2002.

As shown at 550, FIG. 11 shows the months summary values of year 2004, compared to the month's summary values of 2003. The user can click on the month to get the daily summaries.

As shown at 600, FIG. 12 shows the values of the children of the Month level Member at the day level. The calendar displays the holidays in the month of May. The user interface also displays a custom user defined period starting on May 1st and ending on May 7th.

As shown at 650, FIG. 13 displays the day summary for Appliances and Hardware Sales as compared with the same day in a previous year. The three shift layout is a display option. The user can click a date tab to drill down to hourly statistics.

Figure 14:
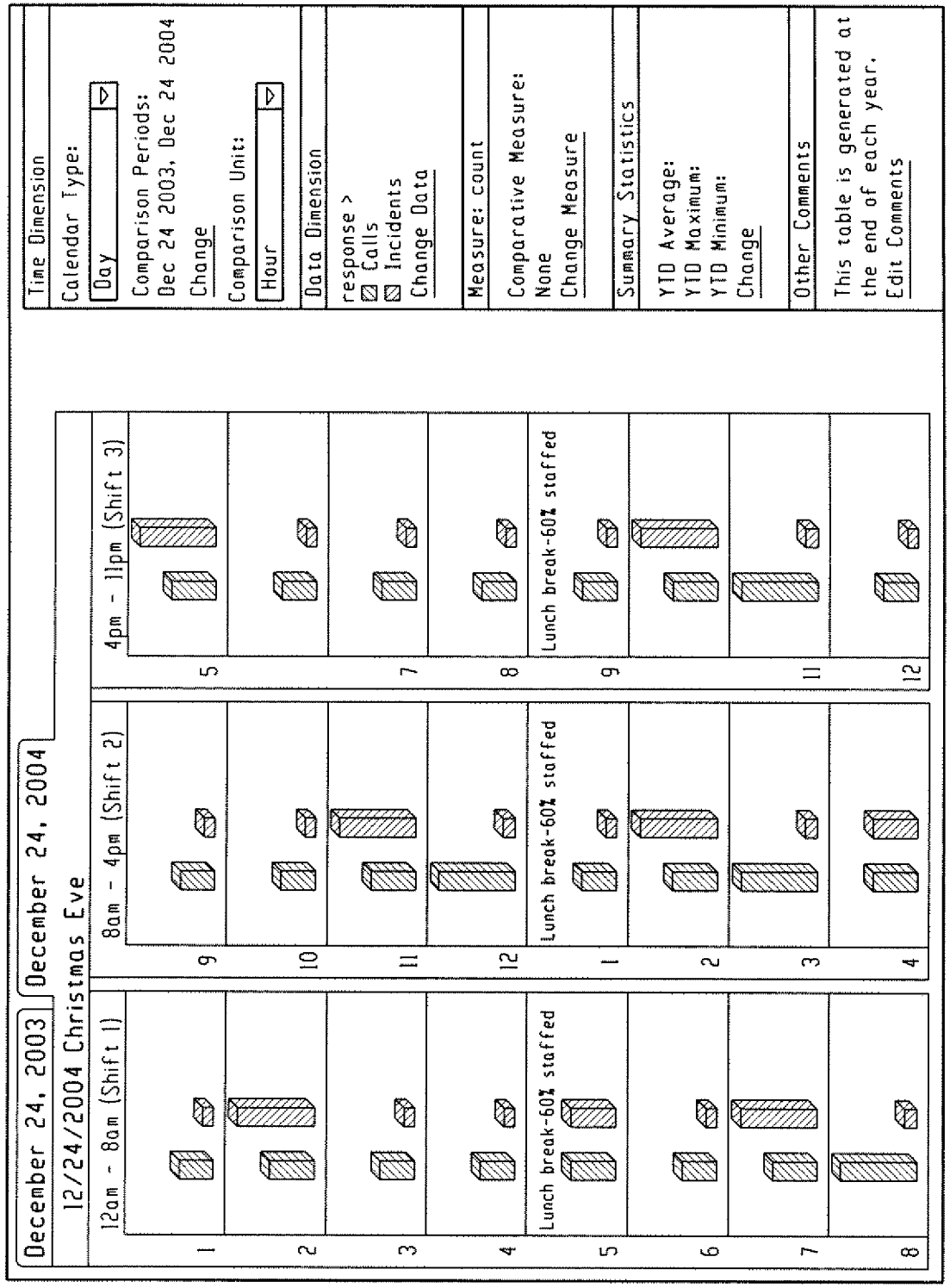
FIG. 14 is a display illustrating an hour of the day calendar presentation example.

As shown at 700, FIG. 14 shows a different cube example that displays hourly summaries for a call center data. The "Lunch Break" text is a type of user defined event that can be incorporated into the calendar. The "Christmas Eve" information is a calendar option that allows the user to view holidays and events specific to a locale.

Figure 15:
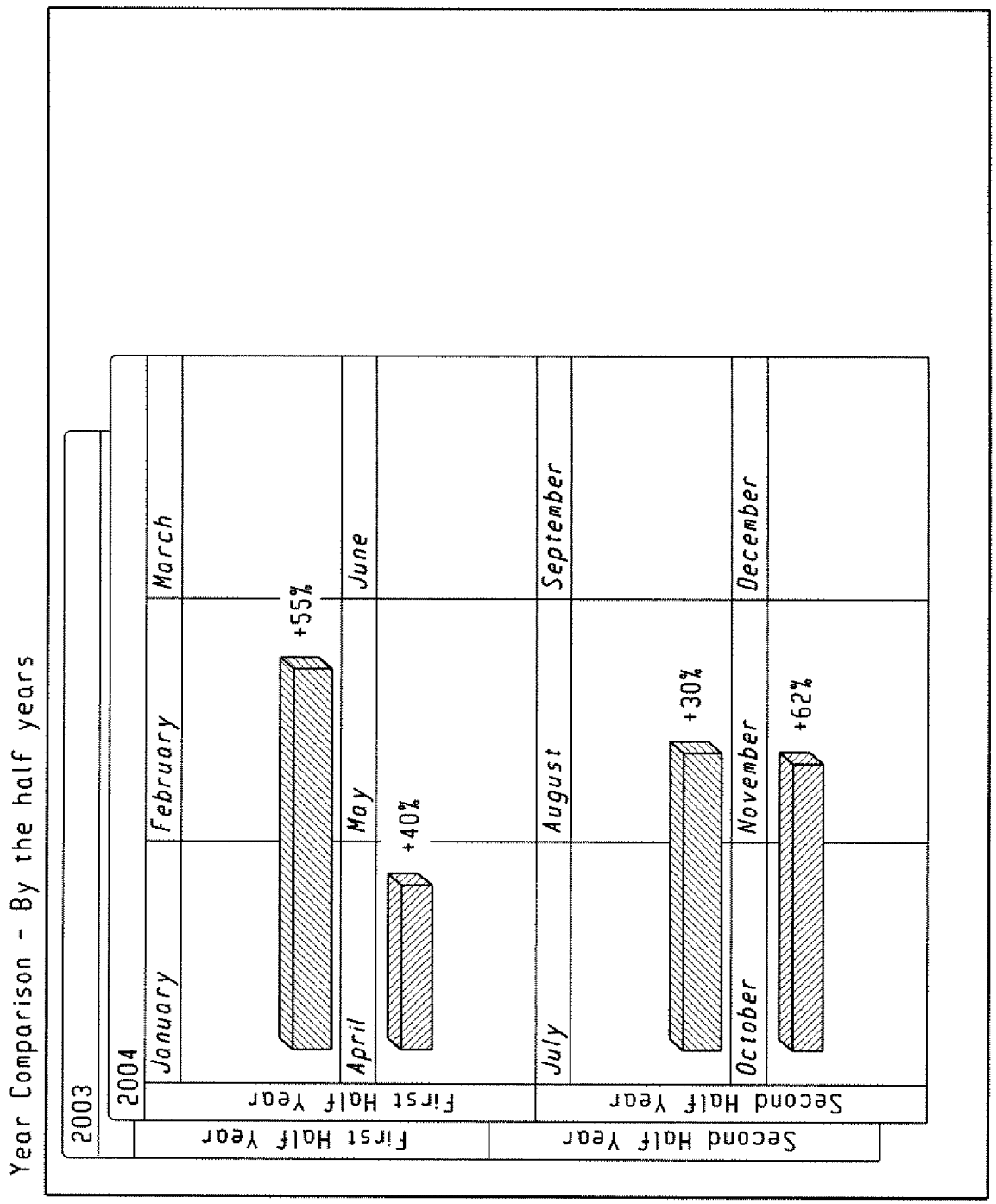
FIG. 15 is a display illustrating a horizontal bar graph presentation example.
Figure 16:
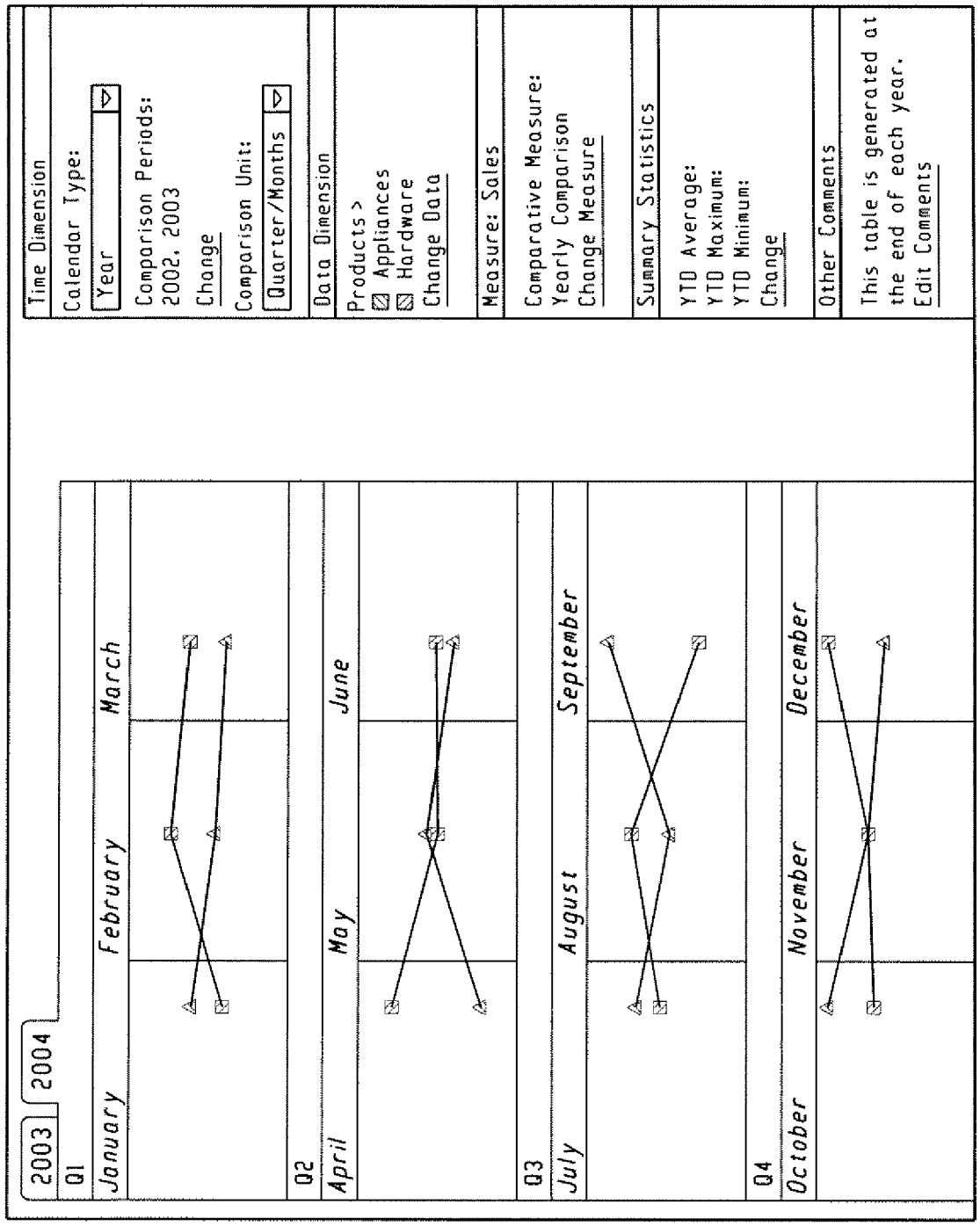
FIG. 16 is a display illustrating a line graph presentation example.
Figure 17:
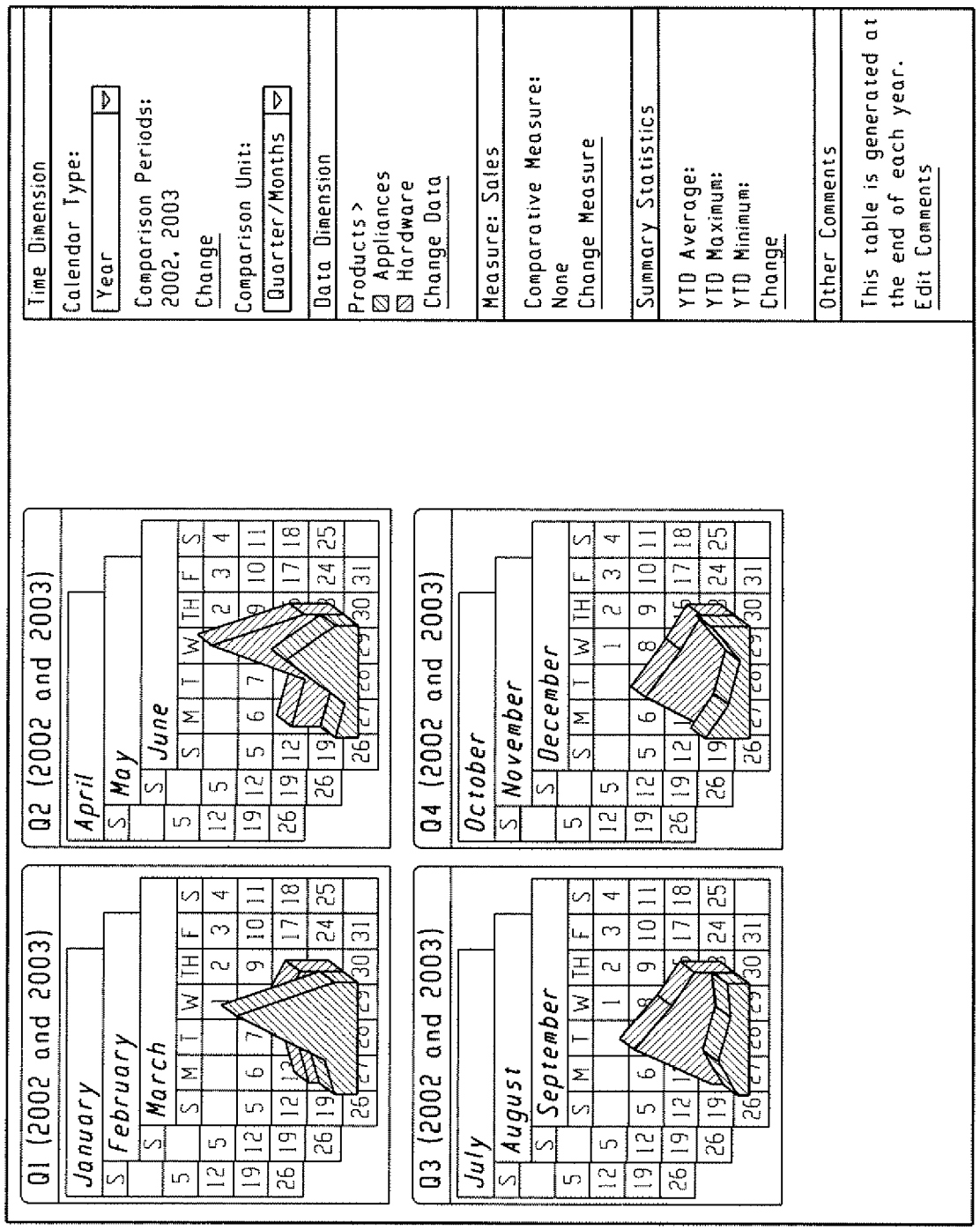
FIG. 17 is a display illustrating an area plot presentation example.
Figure 18:
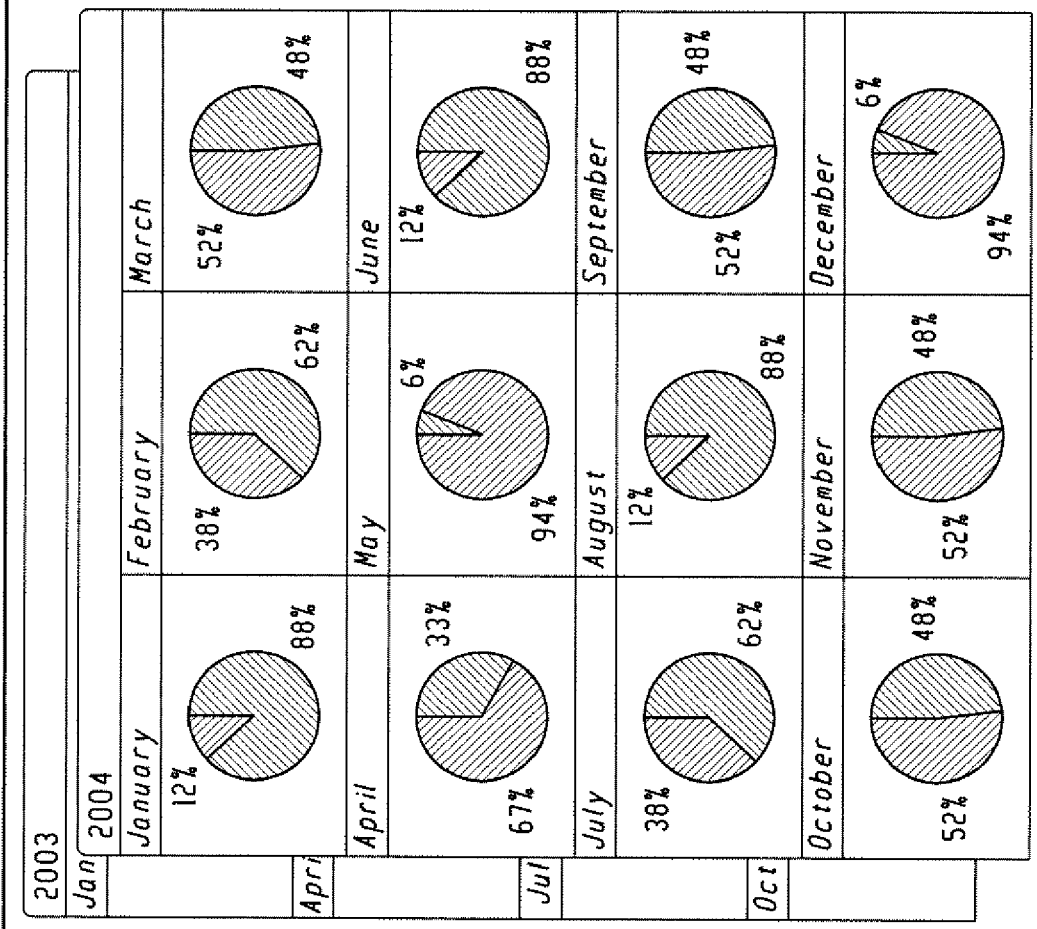
FIG. 18 is a display illustrating a pie chart presentation example.

The graph chart objects shown in these figures represent the tuple values of cube members. A tuple is the cell at the intersection of one or more dimension members and a measure. The graph chart can also be in any type of time-based graph. The following are a few examples: a vertical bar, a horizontal bar (e.g., as shown at 750 in FIG. 15), a line chart (e.g., as shown at 800 in FIG. 16), an area plot (e.g., as shown at 850 in FIG. 17), or a pie chart (e.g., as shown at 900 in FIG. 18).

The calendar may also be customized in appearance and style to display different styles and layout. Users may customize the calendar to enter their own dates and date ranges to be displayed in the calendar object. For example, a calendar display can be customized such that the 1st of May to 12th of May (Mother's day) ad campaign dates are reflected in the calendar. The time calendar can also be based on a fiscal year. Quarters can be customized to reflect seasons of the year. The calendar can also optionally show holiday dates and special events.

Figure 19:
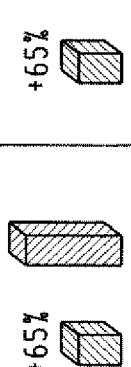
FIG. 19 is a display illustrating a French month of the year calendar presentation example.

The time calendar can use the current locale to display dates in the format appropriate to the current locale. Holidays and culture specific date information can be reflected in the calendar. For example, a calendar operating in a French locale is shown at 950 in FIG. 19.

Figure 20:
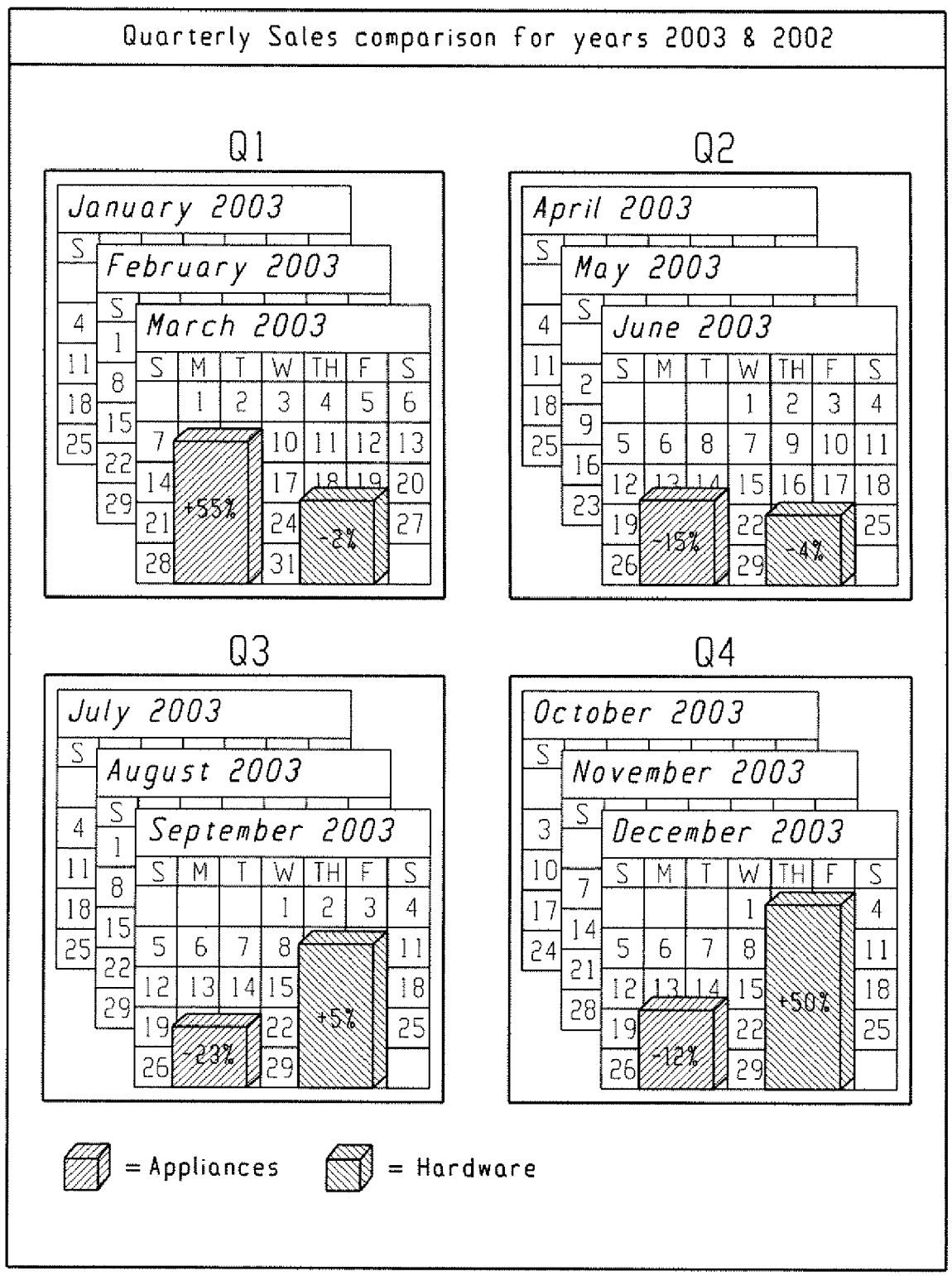
FIG. 20 is a display illustrating an alternative style for quarters of the year calendar presentation example.
Figure 21:
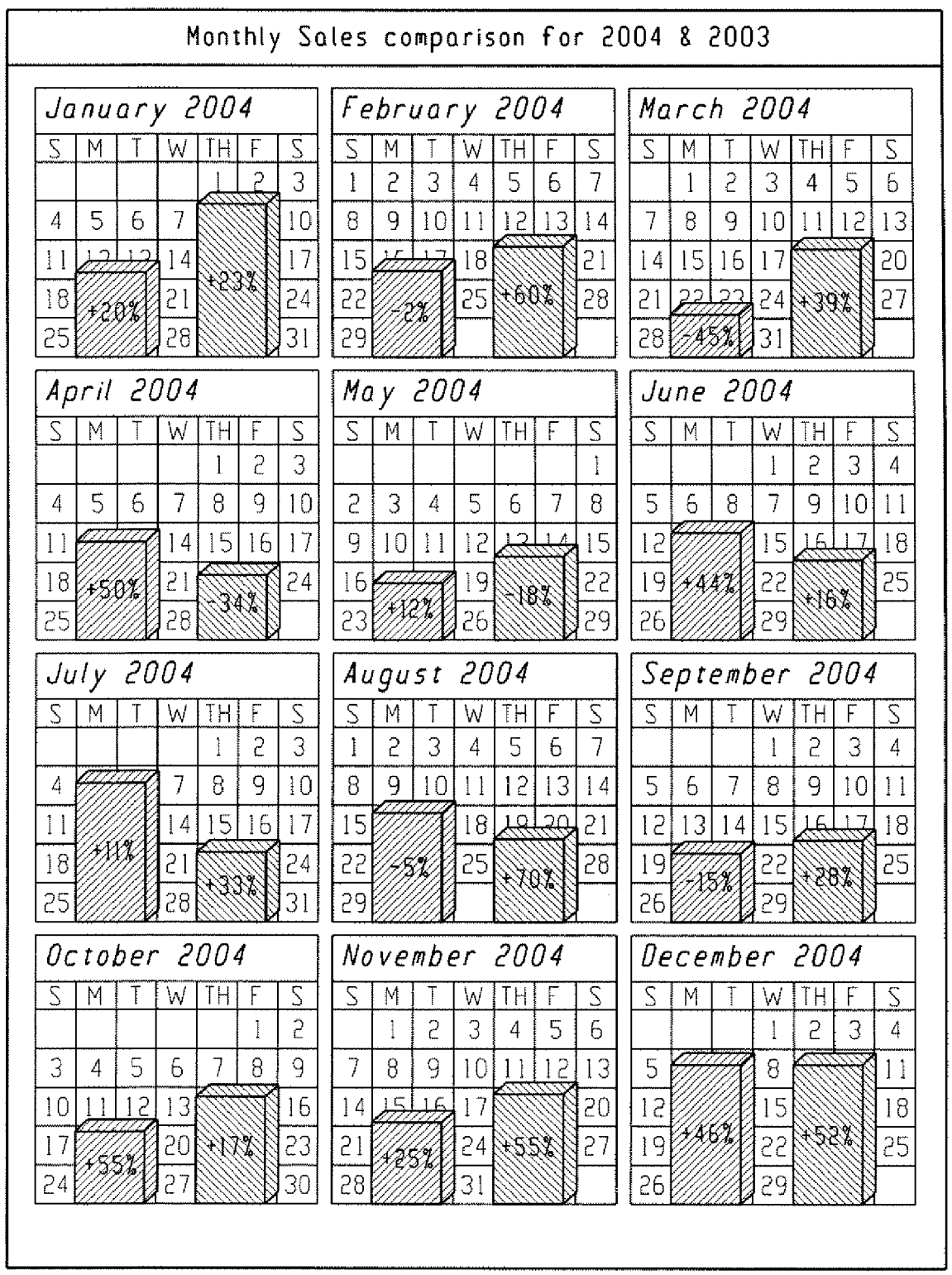
FIG. 21 is a display illustrating a alternative style of the month of the year calendar presentation example.
Figure 22:
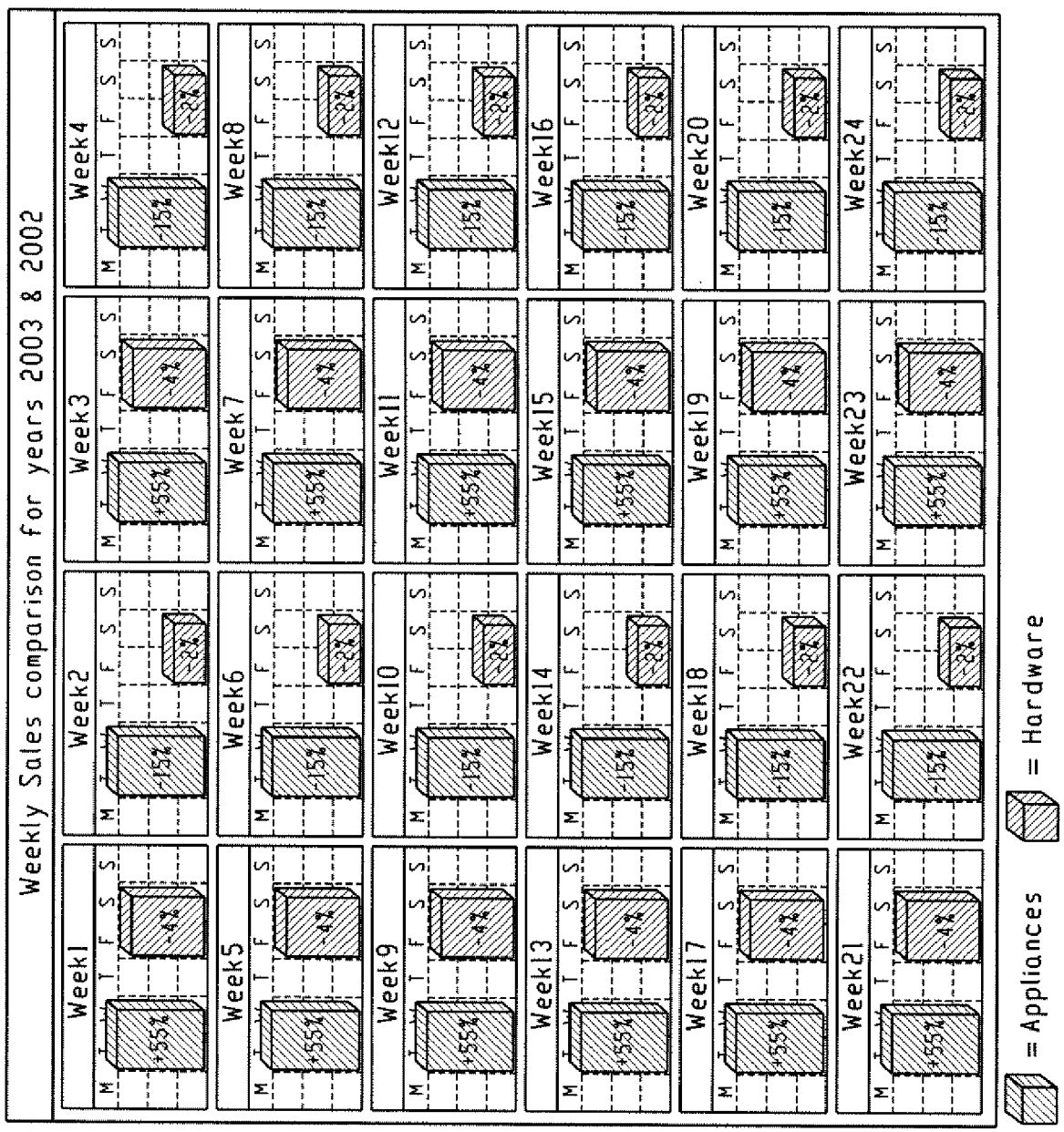
FIG. 22 is a display illustrating a weekly comparison calendar presentation example.
Figure 23:
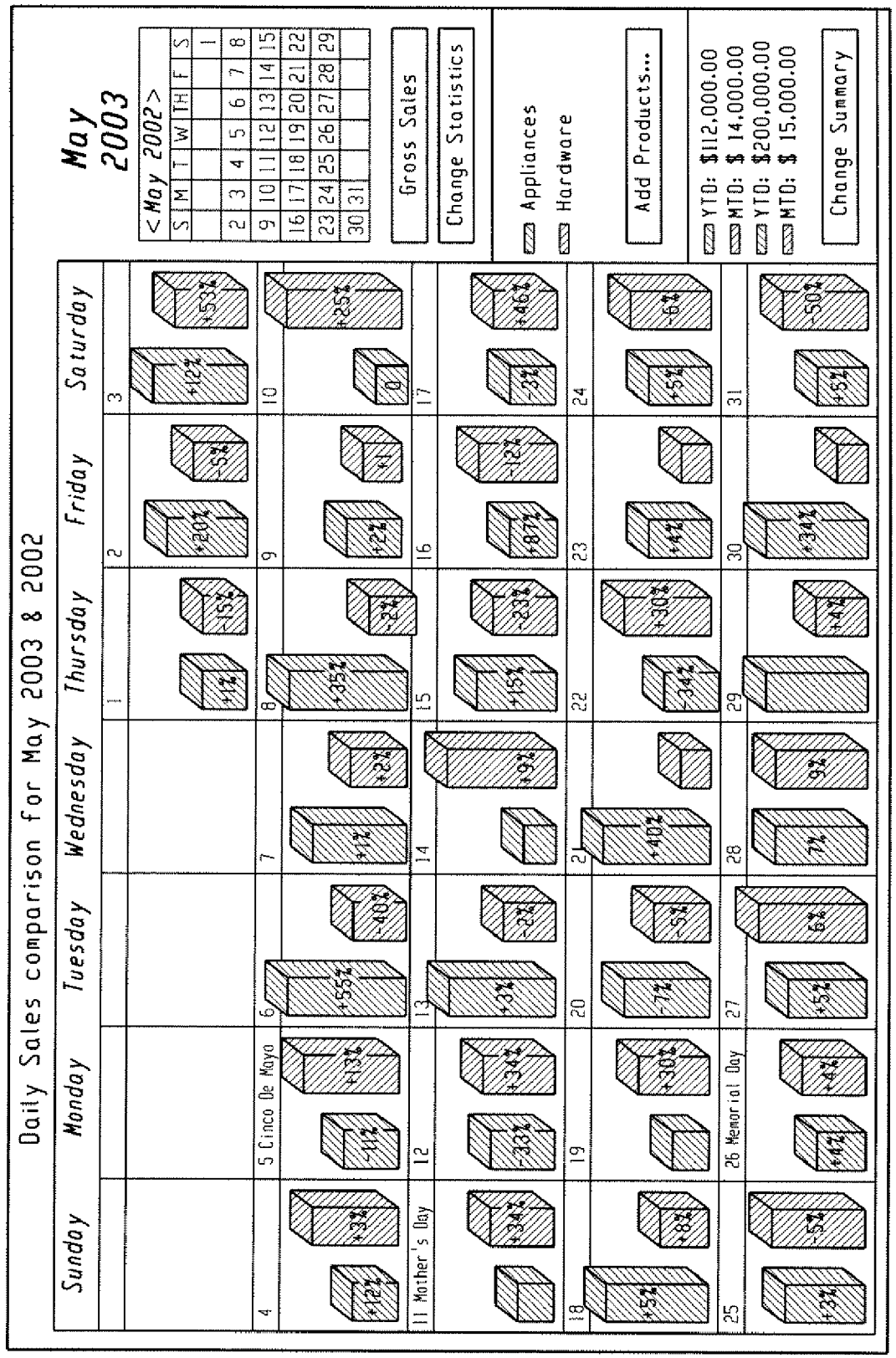
FIG. 23 is a display illustrating an alternate calendar style for day of the month display presentation example.

While examples have been used to disclose the invention, including the best mode, and also to enable any person skilled in the art to make and use the invention, the patentable scope of the invention is defined by claims, and may include other examples that occur to those skilled in the art. For example, many different types of time-based graphical displays can be generated. As an illustration, FIG. 20 shows at 1000 an alternative style for quarters of the year calendar display. FIG. 21 shows at 1050 an alternative style of the month of the year calendar. FIG. 22 shows at 1100 a weekly comparison calendar. FIG. 23 shows at 1150 an alternate calendar style for a day of the month display. Calendar-based formatted displays can include traditional types of calendar displays as well as many other different types that illustrate time-based data.

As another example of the broad ranges of the systems and methods disclosed herein, many different types of time objects may be used, such as centuries, decades, work weeks, work days, days before and after a holiday, hours, minutes, seconds, milliseconds, microseconds, hours in a day, hours in a work day, minutes in an hour, etc.

It is further noted that the systems and methods may be implemented on various types of computer architectures, such as for example on a single general purpose computer or workstation, or on a networked system, or in a client-server configuration, or in an application service provider configuration.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform methods described herein. Other implementations may also be used, however, such as firmware or even appropriately designed hardware configured to carry out the methods and systems described herein.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality (e.g., calendar processing functionality) may be located on a single computer or distributed across multiple computers depending upon the situation at hand (e.g., located on client and/or server computers).

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context clearly dictates otherwise; the phrase "exclusive or" may be used to indicate situation where only the disjunctive meaning may apply.

It is claimed:

1. A computer-implemented method for displaying time-based data retrieved from a multidimensional database, comprising:
    executing software instructions on a computer processor to receive a query for retrieving data from a multidimensional database including a hierarchically arranged time dimension having one or more levels, each level having one or more time dimension members depicted as statistical chart objects;
    executing software instructions on the computer processor to map one or more calendar date objects to one or more statistical chart objects;
    executing software instructions on the computer processor to formulate query results by retrieving data corresponding to the query upon the multidimensional database, the query results including one or more calendar date objects mapped to one or more statistical chart objects;
    executing software instructions on the computer processor to generate a calendar-based graphical display of the query results, wherein the calendar-based graphical display includes one or more calendar date objects and one or more statistical chart objects, wherein the calendar-based graphical display comprises at least four generated control areas including a time dimension area, a data dimension area, a measure area, and a summary statistics area, and wherein each area includes an editable hyperlink for making changes to that area;
    executing software instructions on the computer processor to receive a selection to drill up or drill down on either a calendar date object or a statistical chart object at a first level of detail, wherein when the selection is to drill up, a new calendar date object or a statistical chart object at a second higher level of detail is generated, and wherein when the selection is to drill down, a new calendar date object or a statistical chart object at a second lower level of detail is generated; and
    executing software instructions on the computer processor to generate a new calendar-based graphical display showing the new calendar date object or statistical chart object at the second higher or lower level of detail.

2. The method of claim 1, wherein mapping includes associating the one or more calendar date objects with the one or more statistical chart objects such that a user can use a statistical chart object at a first level of detail to interactively drill down on a time dimension member.

3. The method of claim 2, wherein the calendar-based graphical display is connected to one or more levels of the hierarchy of the multidimensional database allowing the user to interactively drill down.

4. The method of claim 3, wherein the calendar-based graphical display of the query results includes one or more statistical chart objects depicting one or more associated actual calendar dates or calendar time periods.

5. The method of claim 1, wherein mapping includes associating the one or more calendar date objects with the one or more statistical chart objects such that a user can use a statistical chart object at a first level of detail to interactively drill up on a time dimension member.

6. The method of claim 1, wherein the mapping is used to drill down or drill up with respect to the generated calendar-based graphical display.

7. The method of claim 1, wherein calendar processing functionality provides the connection between the calendar-based graphical display and the hierarchy of the multidimensional database;
    wherein when a user manipulates a calendar date object on the displayed calendar in order to drill down, the calendar processing functionality receives information related to the user interaction, and based upon the multidimensional hierarchy, generates a new calendar-based graphical display such that the new calendar-based graphical display includes information that is at a lower level within the time dimension hierarchy than the previous calendar-based graphical display; and
    wherein when a user manipulates a calendar date object on the displayed calendar in order to drill up, the calendar processing functionality receives information related to the user interaction, and based upon the multidimensional hierarchy, generates a new calendar-based graphical display such that the new calendar-based graphical display includes information that is at a higher level within the time dimension hierarchy than the previous calendar-based graphical display.

8. The method of claim 7, wherein the time dimension hierarchy includes two or more members selected from the group that is in the following descending order of time levels: year, quarter, month, week, day, hour, minute, second; and wherein members belonging to the time dimension hierarchy are related in parent-child relationships.

9. The method of claim 1, wherein comparative and summary statistics relating to the time dimension are presented in the calendar.

10. The method of claim 9, wherein the comparative statistics include at least one statistic selected from the group consisting of: parallel period comparison statistics; consecutive period comparison statistics; and relative contribution analysis statistics;
    wherein the summary statistics include statistical analysis of time series data; and wherein the summary statistics include a statistic selected from the group consisting of: year-to-date total and year-to-date average for current members displayed in a chart; quarter-to-date total and quarter-to-date average for current members displayed in a chart; month-to-date total and month-to-date average for current members displayed in a chart; week-to-date total and week-to-date average for current members displayed in a chart; an opening period statistic that represents value of current members at beginning of a time period; and a closing period statistic that represents values of current members at end of a time period.

11. The method of claim 1, wherein the multidimensional database contains data that is categorized into a textual dimension which characterizes a numerical measure; wherein the textual dimension has a hierarchy; and wherein the time and textual dimensional hierarchies are used in a data warehousing application or an Online Analytical Processing (OLAP) application.

12. The method of claim 1, wherein the time dimension is hierarchically arranged such that higher time levels in the hierarchy decompose into lower time levels in the hierarchy.

13. The method of claim 1, wherein an end user or a host application provides the query for retrieving data from the multidimensional database.

14. The method of claim 1, wherein a database engine processes the query, by parsing and translating, optimizing, and evaluating the query in order to formulate a logical expression from the query; and wherein the logical expression is used in searching the hierarchically arranged time dimension for retrieving data from the multidimensional database in response to the query.

15. The method of claim 1, wherein the calendar-based graphical display is customizable based on user preferences and locales.

16. The method of claim 15, wherein the user preferences include customization of the calendar-based graphical display to include holidays and events specific to a locale; and wherein customization based on locales includes customizing the calendar-based graphical display to use language of a locale.

17. The method of claim 1, wherein the calendar-based graphical display is formatted according to at least one format selected from the group consisting of: a year period calendar presentation format; a half-year period calendar presentation format; a quarter period calendar presentation format; a quarter calendar presentation format; a single quarter presentation format; a month summary calendar presentation format; a day of the month calendar presentation format; a day calendar presentation format; an hour of the day calendar presentation format; a horizontal bar graph presentation format; a line graph presentation format; an area plot presentation format; a pie chart presentation format; and a French month of the year calendar presentation format.

18. The method of claim 1, wherein data in the multidimensional database is stored in a cube.

19. The method of claim 1, wherein elements of a statistical chart object compare time dimension members on a level of a second hierarchy.

20. The method of claim 19, wherein the second hierarchy is a product hierarchy.

21. A computer-implemented system for displaying time-based data retrieved from a multidimensional database, comprising:
a database engine configured to execute on a computer processor and to receive a query for retrieving data from a multidimensional database including a hierarchically arranged time dimension having one or more levels, each level having one or more dimension members depicted as statistical chart objects;
software instructions configured to execute on the computer processor and to map one or more calendar date objects to one or more statistical chart objects;
software instructions configured to execute on the computer processor and to formulate query results by retrieving data corresponding to the query upon the multidimensional database, the query results including one or more calendar date objects mapped to one or more statistical chart objects;
software instructions configured to execute on the computer processor and to generate a calendar-based graphical display of the query results, wherein the calendar-based graphical display includes one or more calendar date objects and one or more statistical chart objects, wherein the calendar-based graphical display comprises at least four generated control areas including a time dimension area, a data dimension area, a measure area, and a summary statistics area, and wherein each area includes an editable hyperlink for making changes to that area;
software instructions configured to execute on the computer processor and to receive a selection to drill up or drill down on either a calendar date object or a statistical chart object at a first level of detail, wherein when the selection is to drill up, a new calendar date object or a statistical chart object at a second higher level of detail is generated, and wherein when the selection is to drill down, a new calendar date object or a statistical chart object at a second lower level of detail is generated; and
software instructions configured to execute on the computer processor and to generate a new calendar-based graphical display showing the new calendar date object or statistical chart object at the second higher or lower level of detail.

22. The system of claim 21, wherein the calendar-based graphical display is formatted according to at least one format selected from the group consisting of: a year period calendar presentation format; a half-year period calendar presentation format; a quarter period calendar presentation format; a quarter calendar presentation format; a single quarter presentation format; a month summary calendar presentation format; a day of the month calendar presentation format; a day calendar presentation format; an hour of the day calendar presentation format; a horizontal bar graph presentation format; a line graph presentation format; an area plot presentation format; a pie chart presentation format; and a French month of the year calendar presentation format.

23. A computer-implemented method for displaying time-based data retrieved from a multidimensional database, comprising:
executing software instructions on a computer processor to receive a query for retrieving data from a multidimensional database including a hierarchically arranged time dimension, the query containing hierarchical information specifying data to be retrieved from the hierarchically arranged time dimension;
executing software instructions on the computer processor to associate calendar time units with members of the time dimension, the calendar time units being usable in a calendar-based graphical display including one or more calendar date objects and one or more statistical chart objects, wherein the calendar-based graphical display comprises at least four generated control areas including a time dimension area, a data dimension area, a measure area, and a summary statistics area, wherein each area includes an editable hyperlink for making changes to that area, and wherein the association between calendar time units and members of the time dimension causes one or more members of the time dimension hierarchy to be mapped to one or more time periods in a time dimension calendar;

executing software instructions on the computer processor to generate display information based upon results obtained through the query upon the multidimensional database, the generated display information including the calendar-based graphical display showing the time dimension calendar including one or more calendar time units, the query results appearing as statistical chart objects on the time periods of the one or more calendar time units; and executing software instructions on the computer processor to present comparative and summary statistics relating to the time dimension in the calendar, the comparative statistics including at least one statistic selected from the group consisting of: parallel period comparison statistics, consecutive period comparison statistics, and relative contribution analysis statistics; the summary statistics including statistical analysis of time series data, and a statistic selected from the group consisting of: year-to-date total and year-to-date average for current members displayed in a chart; quarter-to-date total and quarter-to-date average for current members displayed in a chart; month-to-date total and month-to-date average for current members displayed in a chart; week-to-date total and week-to-date average for current members displayed in a chart; an opening period statistic that represents value of current members at beginning of a time period; and a closing period statistic that represents values of current members at end of a time period.

24. The method of claim 23, wherein the chart objects on the time periods of the one or more calendar time units are configured such that a user can interactively drill down on time periods by drilling down on a chart object or by drilling down a time dimension member using a chart object.

25. The method of claim 24, wherein the calendar-based graphical display is connected to one or more levels of the hierarchy of the multidimensional database, allowing the user to interactively drill down.

26. The method of claim 23, wherein the query results are displayed as graphical date chart objects within a time period in a calendar-based graphical format; and
wherein the one or more calendar time units include one or more actual calendar dates or calendar time periods.

27. The method of claim 23, wherein the chart objects on the time periods of the one or more calendar time units are configured such that a user can interactively drill up on time periods by drilling up on a chart object or by drilling up by a time dimension member using a chart object.

28. The method of claim 23, wherein the associating is used to drill down or drill up with respect to the generated calendar-based graphical display.

29. The method of claim 23, wherein calendar processing functionality provides the connection between the calendar-based graphical display and the hierarchy of the multidimensional database;
wherein when a user manipulates a chart object on the displayed calendar in order to drill down, the calendar processing functionality receives information related to the user interaction and based upon the multidimensional hierarchy, generates a new calendar-based graphical display such that the new calendar-based graphical display includes information that is at a lower level within the time dimension hierarchy than the previous calendar-based graphical display; and
wherein when a user manipulates a chart object on the displayed calendar in order to drill up, the calendar processing functionality receives information related to the user interaction and based upon the multidimensional hierarchy, generates a new calendar-based graphical display such that the new calendar-based graphical display includes information that is at a higher level within the time dimension hierarchy than the previous calendar-based graphical display.

30. The method of claim 29, wherein the time dimension hierarchy includes two or more members selected from the group that is in the following descending order of time levels: year, quarter, month, week, day, hour, minute, second; and wherein members belonging to the time dimension hierarchy are related in parent-child relationships.

31. The method of claim 23, wherein the multidimensional database contains data that is categorized into a textual dimension which characterizes a numerical measure; wherein the textual dimension has a hierarchy; and wherein the time and textual dimensional hierarchies are used in a data warehousing application or an Online Analytical Processing (OLAP) application.

32. The method of claim 23, wherein the time dimension is hierarchically arranged such that higher time levels in the hierarchy decompose into lower time levels in the hierarchy.

33. The method of claim 23, wherein an end user or a host application provides the query for retrieving data from the multidimensional database.

34. The method of claim 23, wherein a database engine processes the query, by parsing and translating, optimizing, and evaluating the query in order to formulate a logical expression from the query; and wherein the logical expression is used in searching the hierarchically arranged time dimension for retrieving data from the multidimensional database in response to the query.

35. The method of claim 23, wherein the calendar-based graphical display is customizable based on user preferences and locales.

36. The method of claim 35, wherein the user preferences include customization of the calendar-based graphical display to include holidays and events specific to a locale; and wherein customization based on locales includes customizing the calendar-based graphical display to use language of a locale.

37. A computer-implemented system for displaying time-based data retrieved from a multidimensional database, comprising:
a database engine configured to execute on a computer processor and to receive a query for retrieving data from a multidimensional database including a hierarchically arranged time dimension, the query containing hierarchical information specifying data to be retrieved from the hierarchically arranged time dimension;
software instructions configured to execute on the computer processor and to associate calendar units with members of the time dimension, the association between calendar units and members of the time dimension causing one or more members of the time dimension hierarchy to be mapped to one or more time periods in a time dimension calendar;
software instructions configured to execute on the computer processor and to generate display information based upon results obtained through the query upon the multidimensional database, the generated display information including a calendar-based graphical display showing the time dimension calendar including one or more calendar units, the query results appearing as the time periods of the one or more calendar units, the calendar-based graphical display further including at least four generated control areas including a time dimension area, a data dimension area, a measure area, and a summary statistics area, wherein each area includes an editable hyperlink for making changes to that area; and software instructions configured to execute on the computer processor and to present comparative and summary statistics relating to the time dimension in the calendar, the comparative statistics including at least one statistic selected from the group consisting of: parallel period comparison statistics, consecutive period comparison statistics, and relative contribution analysis statistics; the summary statistics including statistical analysis of time series data, and a statistic selected from the group consisting of: year-to-date total and year-to-date average for current members displayed in a chart; quarter-to-date total and quarter-to-date average for current members displayed in a chart; month-to-date total and month-to-date average for current members displayed in a chart; week-to-date total and week-to-date average for current members displayed in a chart; an opening period statistic that represents value of current members at beginning of a time period; and a closing period statistic that represents values of current members at end of a time period.

* * * * *